(12) United States Patent
Kinoshita

(10) Patent No.: US 10,889,200 B2
(45) Date of Patent: Jan. 12, 2021

(54) VEHICLE ELECTRIC POWER SUPPLY APPARATUS

(71) Applicant: SUBARU CORPORATION, Tokyo (JP)

(72) Inventor: Takahiro Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 203 days.

(21) Appl. No.: 16/165,800

(22) Filed: Oct. 19, 2018

(65) Prior Publication Data

US 2019/0232791 A1 Aug. 1, 2019

(30) Foreign Application Priority Data

Jan. 26, 2018 (JP) ................... 2018-011591

(51) Int. Cl.
| | |
|---|---|
| *B60L 1/00* | (2006.01) |
| *B60L 3/00* | (2019.01) |
| *B60L 58/15* | (2019.01) |
| *B60L 58/10* | (2019.01) |
| *H02J 7/14* | (2006.01) |

(52) U.S. Cl.
CPC ............... *B60L 58/15* (2019.02); *B60L 58/10* (2019.02); *H02J 7/1423* (2013.01)

(58) Field of Classification Search
CPC .... B60L 50/90; B60L 58/10; B60L 2240/547; B60L 15/2009; B60L 58/20; B60L 58/21; B60L 58/15; B60L 7/18; H02J 7/1423; H02J 2310/48
See application file for complete search history.

(56) References Cited

U.S. PATENT DOCUMENTS

| | | | | |
|---|---|---|---|---|
| 2011/0001352 A1* | 1/2011 | Tamura | ...................... | B60L 7/12 307/9.1 |
| 2016/0257270 A1* | 9/2016 | Teramoto | .............. | B60R 16/033 |
| 2016/0288652 A1* | 10/2016 | Suzuki | .................... | B60L 15/20 |

FOREIGN PATENT DOCUMENTS

JP     2014-036557 A     2/2014

* cited by examiner

*Primary Examiner* — Rexford N Barnie
*Assistant Examiner* — Rasem Mourad
(74) *Attorney, Agent, or Firm* — McDermott Will & Emery LLP

(57) ABSTRACT

A vehicle electric power generation apparatus includes an electric power generator, a first electric power storage, a second electric power storage, a first voltage detector, a second voltage detector, and an electric power generation controller. The controller sets, as a first allowable voltage, an upper limit value of a terminal voltage of the first storage and sets, as a second allowable voltage, an upper limit value of a terminal voltage of the second storage, and raises, when the generator is to be controlled in a regenerative electric power generation state, a generated voltage derived from the generator higher than both of the first allowable voltage and the second allowable voltage. When the terminal voltage of the first storage reaches the first allowable voltage or the terminal voltage of the second storage reaches the second allowable voltage, the controller prevents the generated voltage of the generator from rising.

5 Claims, 14 Drawing Sheets

VEHICLE ELECTRIC POWER SUPPLY APPARATUS

CROSS-REFERENCE TO RELATED APPLICATIONS

The present application claims priority from Japanese Patent Application No. 2018-011591 filed on Jan. 26, 2018, the entire contents of which are hereby incorporated by reference.

BACKGROUND

The technology relates to a vehicle electric power supply apparatus to be included in a vehicle.

A vehicle electric power supply apparatus included in a vehicle has been proposed that generates electricity by means of regeneration performed by an electric power generator such as an integrated starter generator (ISG) upon vehicle deceleration. For example, reference is made to Japanese Unexamined Patent Application Publication (JP-A) No. 2014-36557. JP-A No. 2014-36557 discloses an electric power supply apparatus having a lead-acid battery and a lithium-ion battery coupled to each other in a parallel manner. The lead-acid battery and the lithium-ion battery each are an electric power storage. This configuration makes it possible to charge not only the lead-acid battery but also the lithium-ion battery with use of regenerative electric power. Therefore, it is possible to increase the regenerative electric power and enhance an energy efficiency of the vehicle accordingly.

SUMMARY

An aspect of the technology provides a vehicle electric power generation apparatus that includes: an electric power generator coupled to a wheel via a power transmission path; a first electric power storage coupled to the electric power generator; a second electric power storage coupled to the electric power generator in which the second electric power storage is coupled to the first electric power storage in parallel; a first voltage detector configured to detect a terminal voltage of the first electric power storage; a second voltage detector configured to detect a terminal voltage of the second electric power storage; and an electric power generation controller configured to set as a first allowable voltage an upper limit value of the terminal voltage of the first electric power storage and set as a second allowable voltage an upper limit value of the terminal voltage of the second electric power storage, and raise a generated voltage derived from the electric power generator higher than both of the first allowable voltage and the second allowable voltage, when the electric power generator is to be controlled in a regenerative electric power generation state. The electric power generation controller is configured to prevent the generated voltage of the electric power generator from rising, when the terminal voltage of the first electric power storage reaches the first allowable voltage, or when the terminal voltage of the second electric power storage reaches the second allowable voltage.

An aspect of the technology provides a vehicle electric power generation apparatus that includes: an electric power generator coupled to a wheel via a power transmission path; a first electric power storage coupled to the electric power generator; a second electric power storage coupled to the electric power generator and coupled to the first electric power storage in parallel; a first voltage detector configured to detect a terminal voltage of the first electric power storage; a second voltage detector configured to detect a terminal voltage of the second electric power storage; and circuitry configured to set, as a first allowable voltage, an upper limit value of the terminal voltage of the first electric power storage, set, as a second allowable voltage, an upper limit value of the terminal voltage of the second electric power storage, raise a generated voltage derived from the electric power generator higher than both of the first allowable voltage and the second allowable voltage, when the electric power generator is to be controlled in a regenerative electric power generation state, and prevent the generated voltage of the electric power generator from rising, when the terminal voltage of the first electric power storage reaches the first allowable voltage or when the terminal voltage of the second electric power storage reaches the second allowable voltage.

DETAILED DESCRIPTION

Figure 1:
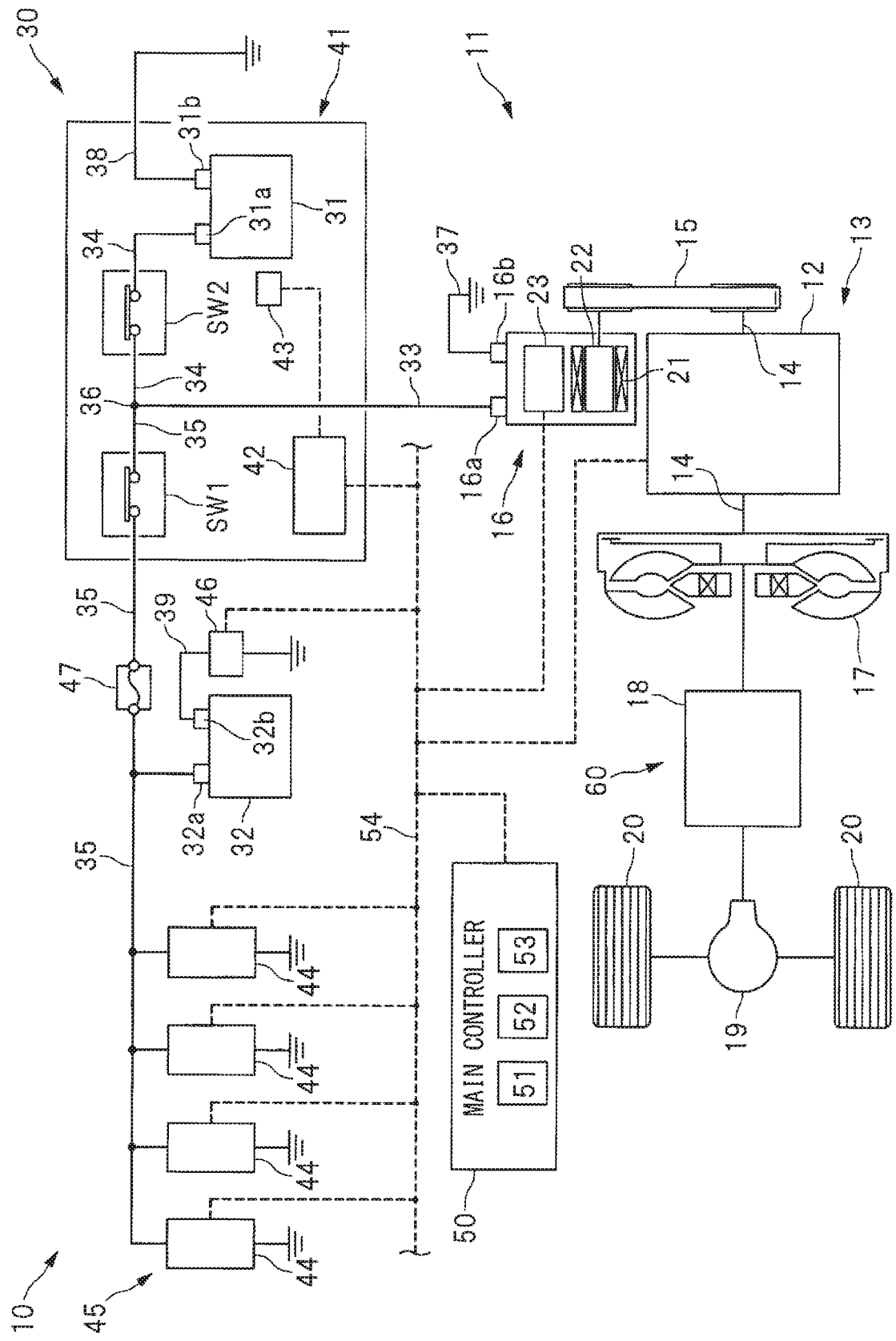
FIG. 1 is a schematic view of a configuration example of a vehicle including a vehicle electric power supply apparatus according to one implementation of the technology.

In the following, some implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

In terms of suppressing deterioration of characteristics such as, but not limited to, reduction in battery capacity or reduction in output electric power, an upper limit voltage of an applied voltage is set to a battery such as a lead-acid battery or a lithium-ion battery. For this reason, when generating electricity by means of regeneration performed by an electric power generator upon vehicle deceleration, it is necessary to so control a generated voltage as not to exceed the upper limit voltage. In other words, the upper limit voltage limits the generated voltage, which makes it difficult to increase regenerative electric power derived from the electric power generator.

It is desirable to increase the regenerative electric power derived from the electric power generator.

[Vehicle Configuration]

FIG. 1 is a schematic diagram illustrating a configuration example of a vehicle 11 including a vehicle electric power supply apparatus 10 according to an example implementation of the technology. Referring to FIG. 1, the vehicle 11 may include a power unit 13. The power unit 13 may include an engine 12 that serves as a power source. The engine 12 may include a crankshaft 14 that is mechanically coupled to a starter generator 16 via a belt mechanism 15. The engine 12 may also be coupled to a transmission mechanism 18 via a torque converter 17. The transmission mechanism 18 may be coupled to wheels 20 via a member such as a differential mechanism 19. In other words, the starter generator 16 and the wheels 20 may be coupled to each other via a power transmission path 60. The power transmission path 60 may include components such as the torque converter 17 or the transmission mechanism 18. In one implementation, the starter generator 16 may serve as an "electric power generator".

The starter generator 16 coupled to the engine 12 may be a so-called integrated starter generator (ISG) that serves both as an electric power generator and an electric motor. The starter generator 16 may serve as not only an electric power generator driven by the crankshaft 14 but also an electric motor that drives the crankshaft 14. For example, the starter generator 16 may be controlled in a powering state as the electric motor when restarting the engine 12 in an idling stop control, or when performing assist driving of the engine 12 upon start or acceleration.

The starter generator 16 may include a stator 21 having a stator coil and a rotor 22 having a field coil. The starter generator 16 may further include an ISG controller 23 in order to control an electrically-conducting state of each of the stator coil and the field coil. The ISG controller 23 may include components such as an inverter, a regulator, or a microcomputer. The ISG controller 23 may control the electrically-conducting state of each of the field coil and the stator coil, thereby making it possible to control an electric power generation voltage, electric power generation torque, powering torque, and/or any other factor, of the starter generator 16.

[Electric Power Supply Circuit]

Figure 2:
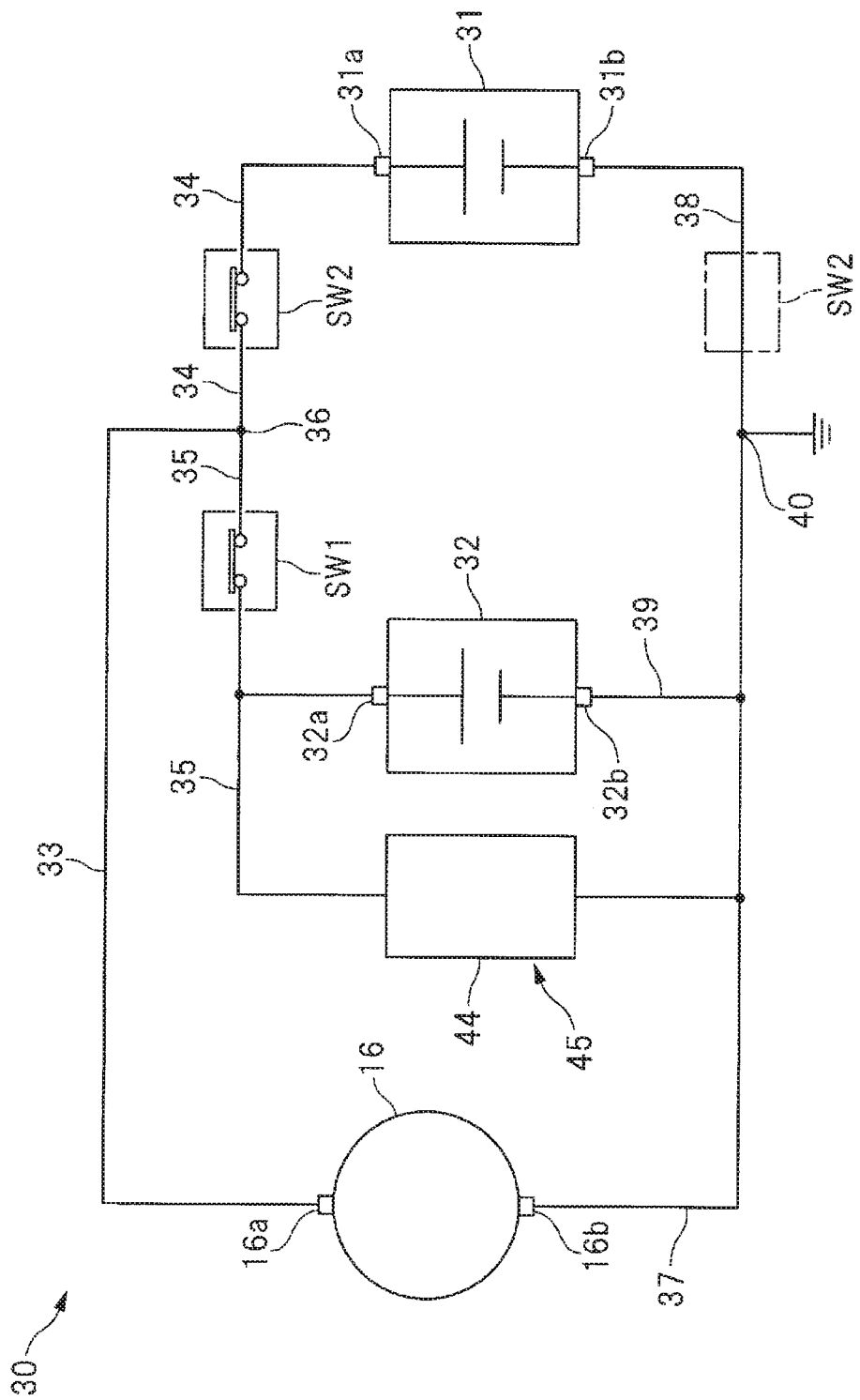
FIG. 2 is a circuit diagram schematically illustrating an example of an electric power supply circuit illustrated in FIG. 1.

A description is given of an electric power supply circuit 30 included in the vehicle electric power supply apparatus 10. FIG. 2 is a circuit diagram schematically illustrating an example of the electric power supply circuit 30. Referring to FIG. 2, the electric power supply circuit 30 may include a lithium-ion battery 31 and a lead-acid battery 32. In one implementation, the lithium-ion battery 31 may serve as a "first electric power storage". In one implementation, the lead-acid battery 32 may serve as a "second electric power storage". The lithium-ion battery 31 and the lead-acid battery 32 may be coupled to each other in parallel, and may be electrically coupled to the starter generator 16. In terms of suppressing deterioration of characteristics such as reduction in battery capacity or reduction in output electric power, an upper limit voltage of applied voltage Limax may be set for the lithium-ion battery 31. In other words, the allowable application of the voltage to the lithium-ion battery 31 may be no greater than the upper limit voltage Limax. Hereinafter, the upper limit voltage Limax may also be referred to as a first allowable voltage. Further, in terms of suppressing deterioration of characteristics such as reduction in battery capacity and reduction in output electric power, an upper limit voltage Pbmax may be set for the lead-acid battery 32. In other words, the allowable application of the voltage to the lead-acid battery 32 may be no greater than the upper limit voltage Pbmax. Hereinafter, the upper limit voltage Pbmax may also be referred to as a second allowable voltage. In an example implementation, the upper limit voltage Limax of the lithium-ion battery 31 and the upper limit voltage Pbmax of the lead-acid battery 32 may differ from each other. For example, the upper limit voltage Limax may be 15 V. For example, the upper limit voltage Pbmax may be 14.3 V. The lithium-ion battery 31 may include a terminal voltage that is designed higher than a terminal voltage of the lead-acid battery 32 in order to actively discharge the lithium-ion battery 31. Further, the lithium-ion battery 31 may include internal resistance that is designed smaller than internal resistance of the lead-acid battery 32 in order to actively discharge the lithium-ion battery 31.

The starter generator 16 may include a positive terminal 16a coupled to a positive line 33. The lithium-ion battery 31 may include a positive terminal 31a coupled to a positive line 34. The lead-acid battery 32 may include a positive line 32a coupled to a positive line 35. These positive lines 33 to 35 may be coupled to one another via a node 36. Further, the starter generator 16 may include a negative terminal 16b coupled to a negative line 37. The lithium-ion battery 31 may include a negative terminal 31b coupled to a negative line 38. The lead-acid battery 32 may include a negative terminal 32b coupled to a negative line 39. These negative lines 37 to 39 may be coupled to one another via a reference potential point 40. In one implementation, the positive line 33 may serve as a "first conduction path". In one implementation, the positive line 34 may serve as a "second conduction path". In one implementation, the positive line 35 may serve as a "third conduction path".

The positive line 35 of the lead-acid battery 32 may be provided with a switch SW1 that is switchable between an electrically-conductive state and a cutoff state. The switch SW1 may be controlled into the electrically conductive state by a later-described battery controller 42, and thereby the starter generator 16 and the lead-acid battery 32 is electrically coupled to each other. In contrast, the battery controller 42 may control the switch SW1 into the cutoff state, and thereby the starter generator 16 and the lead-acid battery 32 are electrically separated from each other. Further, the positive line 34 of the lithium-ion battery 31 may be provided with a switch SW2 that is switchable between the electrically-conductive state and the cutoff state. The battery controller 42 may control the switch SW2 into the electrically conductive state, and thereby the starter generator 16 and the lithium-ion battery 31 are electrically coupled to each other. In contrast, the battery controller 42 may control the switch SW2 into the cutoff state, and thereby the starter generator 16 and the lithium-ion battery 31 are electrically separated from each other. The switches SW1 and SW2 each may include a semiconductor element such as, but not limited to, a metal-oxide-semiconductor field-effect transistor (MOSFET). In an example implementation, the switches SW1 and SW2 each may be a mechanical switch that opens and closes a contact by means of electromagnetic force, for example. Note that the switches SW1 and SW2 each may include a relay, a contactor, and/or any other components.

Referring to FIG. 1, the electric power supply circuit 30 may include a battery module 41. The lithium-ion battery 31 and the switches SW1 and SW2 may be incorporated into the battery module 41. The battery module 41 may further include the batter controller 42. The battery controller 42 may include a microcomputer, for example. The battery module 41 may also include a battery sensor 43 that detects factors such as charge and discharge currents or the terminal voltage of the lithium-ion battery 31. The battery controller 42 may further have a monitoring function and a control function. Non-limiting examples of the monitoring function may include monitoring of a state of charge SOC, charge and discharge currents, the terminal voltage, a cell temperature, and the internal resistance of the lithium-ion battery 31. Non-limiting examples of the control function may include controlling each of the switches SW1 and SW2. Note that the state of charge SOC may refer to a ratio of an electric power storage amount of a battery to a designed capacity of the battery.

The positive line 35 of the lead-acid battery 32 may be coupled to an electrical device group 45. The electrical device group 45 may include a plurality of electrical devices 44. The plurality of electrical devices 44 that configure the electrical device group 45 may include components such as, but not limited to, an electric stability control system including an antiskid brake system, electric power steering, or headlights. Further, although unillustrated, the positive line 35 of the lead-acid battery 32 may also be coupled to various controllers as the electrical devices 44, such as the ISG controller 23, the battery controller 24, or a later-described main controller 50. Further, the negative line 39 of the lead-acid battery 32 may also be provided with a battery sensor 46. The battery sensor 46 may have a detection function that detects the state of change SOC, charge and discharge currents, a terminal voltage, and any other factors of the lead-acid battery 32. The positive line 33 may also be provided with a fuse 47 that protects a device such as the electrical device group 45.

[Control System of Vehicle Electric Power Supply Apparatus]

Referring to FIG. 1, the vehicle electric power supply apparatus 10 may be provided with the main controller 50. The main controller 50 may include a microcomputer, for example. The main controller 50 may include units such as an engine controller 51, an electric power generation controller 52, or a switch controller 53. The engine controller 51 may control the engine 12. The electric power generation controller 52 may control the starter generator 16. The switch controller 53 may control the switches SW1 and SW2. The main controller 50 and other controllers such as the ISG controller 23 or the battery controller 42 may be so coupled to one another as to be able to perform communication mutually and freely via an in-vehicle network 54. Non-limiting examples of the in-vehicle network 54 may include a controller area network (CAN) and a local interconnect network (LIN).

The units of the main controller 50 may control devices including the engine 12, the starter generator 16, or the switches SW1 and SW2, on the basis of pieces of information obtained from the various controllers and sensors. For example, the engine controller 51 of the main controller 50 may output a control signal to an unillustrated component such as a throttle valve or an injector to thereby control a factor such as output torque of the engine 12. Further, the electric power generation controller 52 of the main controller 50 may output a control signal to the ISG controller 23 to thereby control factors including the electric power generation voltage and the electric power generation torque of the starter generator 16. Further, the switch controller 53 of the main controller 50 may output a control signal to the battery controller 42 to thereby control any of the switches SW1 and SW2 into any state such as the electrically-conductive state or the cutoff state.

[Electric Power Supply Situations]

The electric power generation controller 52 of the main controller 50 may set a target electric power-generation voltage of the starter generator 16 on the basis of the state of charge SOC of the lithium-ion battery 31. Thereafter, the electric power generation controller 52 may output information relating to the target electric power-generation voltage to the ISG controller 23. The ISG controller 23 may control the generated voltage derived from the starter generator 16 in accordance with the information relating to the target electric power-generation voltage. The IS G controller 23 may thereby control the starter generator 16 to be in a combustion electric power generation state or an electric power generation suspended state. Accordingly, the electric power generation controller 52 of the main controller 50 may control the starter generator 16 to be in the combustion electric power generation state or the electric power generation suspended state on the basis of the state of charge SOC of the lithium-ion battery 31.

Figure 3:
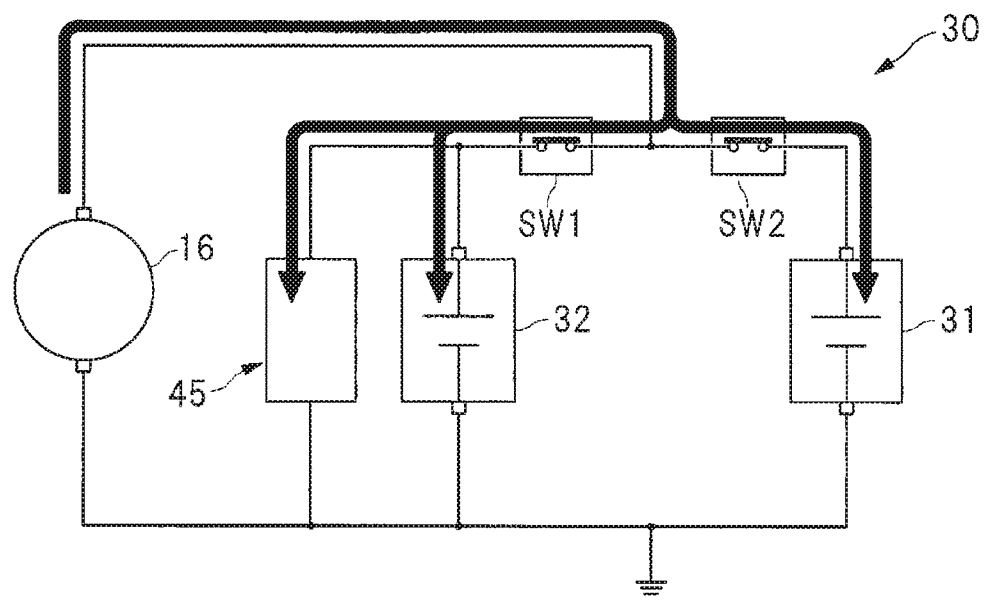
FIG. 3 is a diagram illustrating an example of an electric current supply situation when a starter generator is controlled in a combustion electric power generation state.

FIG. 3 is a diagram illustrating an example of an electric current supply situation when the starter generator 16 is controlled in the combustion electric power generation state. For example, in a case where the state of charge SOC, i.e. a charged level, of the lithium-ion battery 31 is lower than a predetermined lower limit value, the starter generator 16 may be driven to generate electricity by means of engine power in order to charge the lithium-ion battery 31 for enhancement of the state of charge SOC. Accordingly, when the starter generator 16 is to be controlled in the combustion electric power generation state, the generated voltage derived from the starter generator 16 may be raised, and the electric power generation voltage applied to the lithium-ion battery 31 may be adjusted higher than the terminal voltage of the lithium-ion battery 31. This causes the starter generator 16 to supply an electric current to components including the lithium-ion battery 31, the electrical device group 45, and the lead-acid battery 32, as indicated by black arrows in FIG. 3. Consequently, components including the lithium-ion battery 31 and the lead-acid battery 32 may be gently charged.

Figure 4:
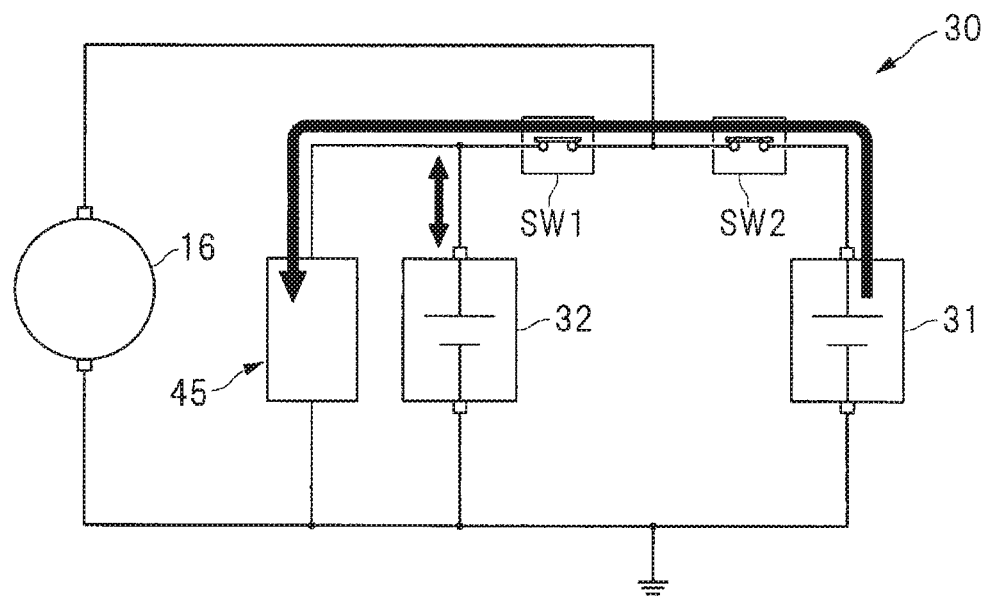
FIG. 4 is a diagram illustrating an example of an electric current supply situation when the starter generator is controlled in an electric power generation suspended state.

FIG. 4 is a diagram illustrating an example of an electric current supply situation when the starter generator 16 is controlled in the electric power generation suspended state. For example, in a case where the state of charge SOC of the lithium-ion battery 31 is higher than a predetermined upper limit value, the driving of the starter generator 16 to generate electricity by means of the engine power may be suspended in order to actively discharge the lithium-ion battery 31. Accordingly, when the starter generator 16 is to be controlled in the electric power generation suspended state, the generated voltage derived from the starter generator 16 may be lowered, and the electric power generation voltage applied to the lithium-ion battery 31 may be adjusted lower than the terminal voltage of the lithium-ion battery 31. This causes the lithium-ion battery 31 to supply an electric current to the electrical device group 45, as indicated by the black arrow in FIG. 4. Hence, this makes it possible to suppress or stop the driving of the starter generator 16 to generate electricity, leading to the reduction in engine load.

In an example implementation described above, the electric power generation controller 52 of the main controller 50 may control the starter generator 16 to be in the state such as the combustion electric power generation state or the electric power generation suspended state on the basis of the state of charge SOC. However, it is advantageous to collect large kinetic energy for enhancement of a fuel consumption performance upon the vehicle deceleration. For this reason, upon the vehicle deceleration, the generated voltage derived from the starter generator 16 may be raised greatly, and the starter generator 16 may be controlled in a regenerative electric power generation state. This makes it possible to increase the electric power generated by the starter generator 16, i.e. the regenerative electric power. Accordingly, it is possible to actively convert the kinetic energy into the electric energy and collect the converted electric energy. Hence, it becomes possible to enhance an energy efficiency of the vehicle 11 and to thereby improve the fuel consumption performance of the vehicle 11.

Whether or not to control the starter generator 16 to be in the regenerative electric power generation state may be determined on the basis of a factor such as an operation state of the accelerator pedal or the brake pedal. In other words, upon coasting where the accelerator pedal is released from being pressed down on or upon vehicle braking where the brake pedal is pressed down on, fuel supply to the engine 12 may be restricted. In such a situation, the starter generator 16 may be controlled in the regenerative electric power generation state. In contrast, upon an acceleration traveling or a steady traveling during which the accelerator pedal is pressed down on, a fuel may be injected in the engine 12. In such a situation, the starter generator 16 may be controlled in the combustion electric power generation state or the electric power generation suspended state.

Figure 5:
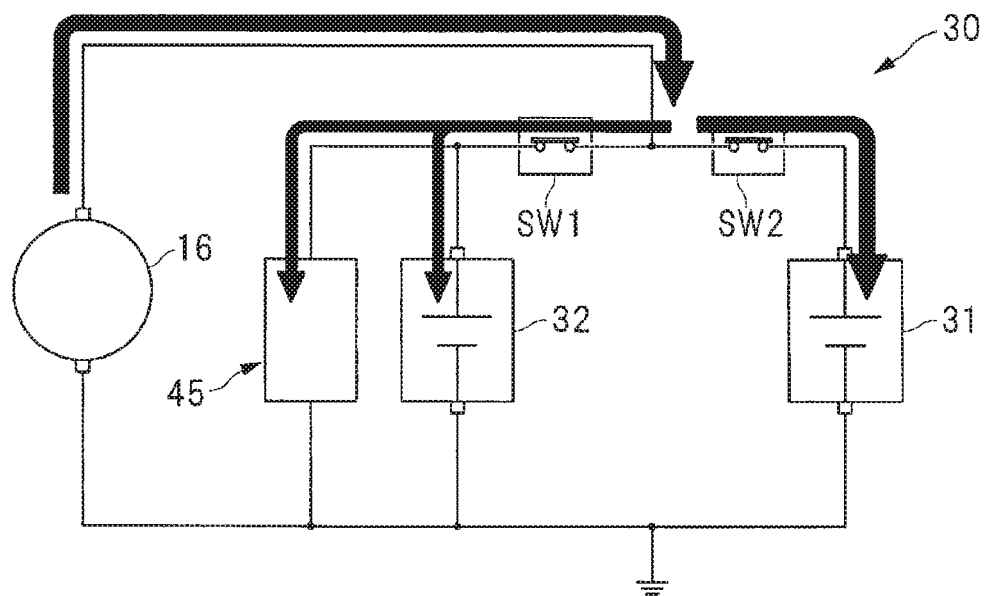
FIG. 5 is a diagram illustrating an example of an electric current supply situation when the starter generator is controlled in a regenerative electric power generation state.

FIG. 5 is a diagram illustrating an example of an electric current supply situation when the starter generator 16 is controlled in the regenerative electric power generation state. When the starter generator 16 is to be controlled in the regenerative electric power generation state, the generated voltage derived from the starter generator 16 may be raised higher than the voltage in the above-described combustion electric power generation state, and the generated voltage applied to the lithium-ion battery 31 may be raised significantly higher than the terminal voltage of the lithium-ion battery 31. This causes the starter generator 16 to supply a large electric current to components including the lithium-ion battery 31 and the lead-acid battery 32, as indicated by the black arrows in FIG. 5. Therefore, the lithium-ion battery 31 and the lead-acid battery 32 may be quickly charged. In addition, the internal resistance of the lithium-ion battery 31 may be designed smaller than the internal resistance of the lead-acid battery 32. Therefore, most of the generated electric current may be supplied to the lithium-ion battery 31.

Referring to FIGS. 3 to 5, when the starter generator 16 is to be controlled in the combustion electric power generation state, the regenerative electric power generation state, or the electric power generation suspended state, the switches SW1 and SW2 may be maintained in the electrically-conductive state. In other words, the vehicle electric power supply apparatus 10 makes it possible to control the charge and the discharge of the lithium-ion battery 31 by simply controlling the generated voltage derived from the starter generator 16, without switching between the switches SW1 and SW2. This makes it possible to easily control the charge and the discharge of the lithium-ion battery 31, and to improve durability of the switch SW1 and the switch SW2.

[Voltage Drop Situation of Electric Power Supply Circuit]

Figure 6:
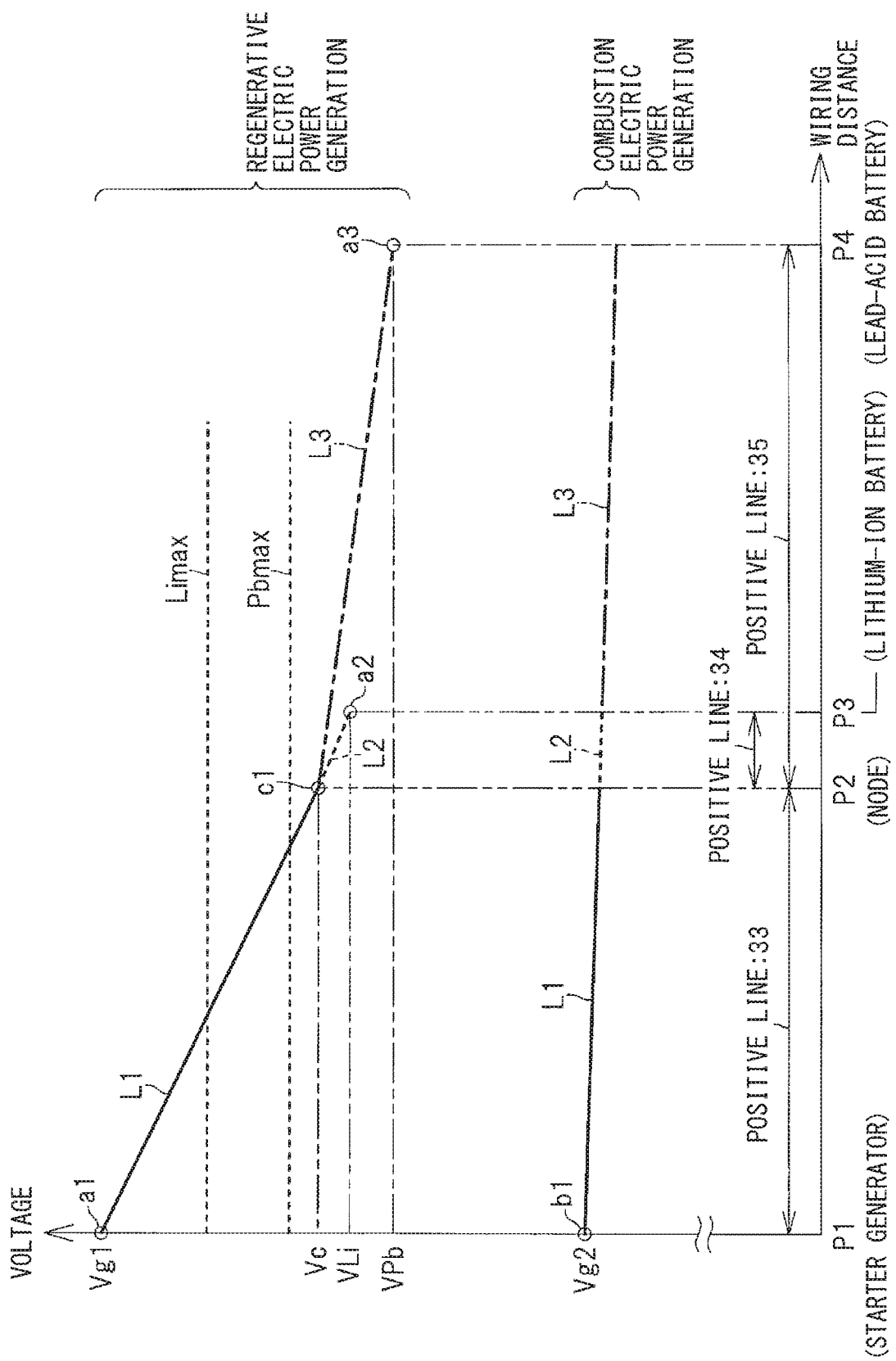
FIG. 6 is a diagram illustrating an example of a voltage drop situation in each part of the electric power supply circuit illustrated in FIG. 1.

FIG. 6 is a diagram illustrating an example of a voltage drop situation in each part of the electric power supply circuit 30. FIG. 6 illustrates a voltage drop situation when the starter generator 16 is controlled in the combustion electric power generation state and the regenerative electric power generation state. Further, in FIG. 6, a voltage drop from the positive terminal 16a of the starter generator 16 to the node 36, i.e. a voltage drop in the positive line 33 (the first conduction path in one implementation), is indicated by the solid line L1; a voltage drop from the node 36 to the positive terminal 31a of the lithium-ion battery 31, i.e. a voltage drop in the positive line 34 (the second conduction path in one implementation), is indicated by a broken line L2; and a voltage drop from the node 36 to the positive terminal 32a of the lead-acid battery 32, i.e. a voltage drop in the positive line 35 (the third conduction path in one implementation), is indicated by an alternate long and short dashed line L3. Note that FIG. 6 illustrates the positive terminal 16a of the starter generator 16, the node 36, the positive terminal 31a of the lithium-ion battery 31, and the positive terminal 32a of the lead-acid battery 32 along the horizontal axis. These parts are denoted as P1, P2, P3, and P4, respectively.

In an example implementation described above, the starter generator 16 may be controlled in the regenerative electric power generation state upon the vehicle deceleration, in order to convert the kinetic energy of the vehicle 11 into the electric energy and collect the converted energy. In the regenerative electric power generation state, it is advantageous to greatly raise the generated voltage derived from the starter generator 16 in order to collect the large kinetic energy. However, excessively raising the generated voltage derived from the starter generator 16 may possibly result in application of voltage that is higher than the upper limit voltage Limax to the lithium-ion battery 31, and application of voltage that is higher than the upper limit voltage Pbmax to the lead-acid battery 32. Therefore, in general, in terms of suppressing deterioration of characteristics of the lithium-ion battery 31 and the lead-acid battery 32, the generated voltage derived from the starter generator 16 is limited to no greater than the upper limit voltage Limax or Pbmax.

However, limiting the generated voltage derived from the starter generator 16 to no greater than the upper limit voltage Limax or Pbmax may possibly result in reduction in the regenerative electric power generated by the starter generator 16, and reduction in the energy efficiency of the vehicle 11. To deal with this situation, in the vehicle electric power supply apparatus 10 according to an example implementation, the generated voltage derived from the starter generator 16 may be controlled and electric resistance of each of the positive lines 33 to 35 may be set as described below, in order to suppress the deterioration of characteristics of the lithium-ion battery 31 and the lead-acid battery 32 while increasing the regenerative electric power.

As indicated by a1 in FIG. 6, when the starter generator 16 is to be controlled in the regenerative electric power generation state, the generated voltage derived from the starter generator 16 may be controlled to Vg1 that is higher than the upper limit voltage Limax and the upper limit voltage Pbmax. Thereafter, even when the generated voltage derived from the starter generator 16 is raised to Vg1, the electric resistance of each of the positive lines 33 and 34 may be so set as to allow a terminal voltage VLi of the lithium-ion battery 31 to be lower than the upper limit voltage Limax, as indicated by a2 in FIG. 6. The positive lines 33 and 34 may couple the starter generator 16 and the lithium-ion battery 31 with each other. Further, even when the generated voltage derived from the starter generator 16 is raised to Vg1, the electric resistance of each of the positive lines 33 and 35 may be so set as to allow a terminal voltage VPb of the lead-acid battery 32 to be lower than the upper limit voltage Pbmax, as indicated by a3 in FIG. 6. The positive lines 33 and 35 may couple the starter generator 16 and the lead-acid battery 32 with each other.

In other words, even when the generated voltage derived from the starter generator 16 is raised to Vg1 as indicated by a1 in FIG. 6, the voltage drops, during the electric conduction through the positive lines 33 to 35, to the extent that the terminal voltage VLi of the lithium-ion battery 31 is lower than the upper limit voltage Limax, and that the terminal voltage VPb of the lead-acid battery 32 is lower than the upper limit voltage Pbmax, as indicated by a2 and a3 in FIG. 6. Accordingly, it is possible to raise the generated voltage derived from the starter generator 16 while suppressing the terminal voltage VLi of the lithium-ion battery 31 to no greater than the upper limit voltage Limax and suppressing the terminal voltage VPb of the lead-acid battery 32 to no greater than the upper limit voltage Pbmax. This makes it possible to increase the regenerative electric power generated by the starter generator 16 while suppressing the deterioration of the lithium-ion battery 31 and the lead-acid battery 32. Note that the positive lines 33 to 35 may be, for example, electric wires, and the electric resistance of each of the positive lines 33 to 35 may be adjusted by, for example, changing the length and the size of the positive lines 33 to 35, or appropriately selecting materials for the positive lines 33 to 35.

Note that increasing the electric resistance of each of the positive lines 33 to 35 may possibly result in reduction in an electric power transmission efficiency of a generated electric current. Therefore, when the starter generator 16 is to be controlled in the combustion electric power generation state, it is advantageous to suppress energy loss caused by the reduction in the electric power transmission efficiency. To deal with this, when the starter generator 16 is to be controlled in the combustion electric power generation state, the generated voltage derived from the starter generator 16 may be controlled to Vg2 that is lower than the upper limit voltage Limax and the upper limit voltage Pbmax, as indicated by b1 in FIG. 6. Accordingly, causing the generated voltage to be lower than Vg2 in the combustion electric power generation state makes it possible to further restrict the generated electric current, as compared with the generated electric current upon the regenerative electric power generation. In other words, even when the electric resistance of each of the positive lines 33 to 35 is increased, it is possible to make the electric current flowing in the positive lines 33 to 35 smaller and suppress the energy loss caused by the reduction in the electric power transmission efficiency. This makes it possible to convert fuel energy supplied to the engine 12 into electric energy efficiently, even when the starter generator 16 is controlled in the combustion electric power generation state.

As described previously, in the combustion electric power generation state of the starter generator 16, i.e. in a situation where the starter generator 16 is driven by means of the engine power to generate electricity, the generated voltage derived from the starter generator 16 may be lowered to Vg2 that is lower than the upper limit voltage Limax and the upper limit voltage Pbmax. This makes it possible to decrease the generated electric current to thereby suppress the reduction in the electric power transmission efficiency, and consequently suppress the energy loss caused by the reduction in the electric power transmission efficiency, even when the electric resistance of each of the positive lines 33 to 35 are high. In other words, it is possible to suppress an amount of voltage drop low when the electric current flows from the starter generator 16 to the lithium-ion battery 31 and the lead-acid battery 32.

In contrast, in the regenerative electric power generation state of the starter generator 16, i.e. in a situation where the starter generator 16 is driven by the kinetic energy of the vehicle 11 to generate electricity, the generated voltage derived from the starter generator 16 may be raised to Vg1 that is higher than the upper limit voltage Limax and the upper limit voltage Pbmax. In this case, the electric current generated by the starter generator 16 may increase and the electric power transmission efficiency may be reduced, which increase the energy loss upon the regenerative electric power generation. In other words, the amount of voltage drop when the electric current flows from the starter generator 16 to the lithium-ion battery 31 and the lead-acid battery 32 becomes large.

However, note that the regenerative electric power generation executed upon the vehicle deceleration may be an electric power generation mode that converts kinetic energy into electric energy and collects the converted energy. Therefore, it is important to increase the amount of collected energy, i.e. the regenerative electric power, even if the amount of voltage drop becomes larger and the energy loss increases. Accordingly, in the regenerative electric power generation state of the starter generator 16, it is possible to increase the regenerative electric power although the energy loss increases. This makes it possible to collect larger kinetic energy, and to thereby improve the fuel consumption performance of the vehicle 11.

In an example implementation described above, the electric resistance of each of the positive lines 33 to 35 may be so set as to allow the terminal voltage VLi of the lithium-ion battery 31 to be lower than the upper limit voltage Limax and as to allow the terminal voltage VPb of the lead-acid battery 32 to be lower than the upper limit voltage Pbmax. However, this is not limitative. For example, as indicated by c1 in FIG. 6, the electric resistance of the positive line 33 may be so set as to allow the applied voltage Vc to the node 36 to be lower than the upper limit voltages Limax and Pbmax. Accordingly, causing the applied voltage Vc to the node 36 to be lower than the upper limit voltages Limax and Pbmax makes it possible to cause the terminal voltage VLi of the lithium-ion battery 31 to be lower than the upper limit voltage Limax and cause the terminal voltage VPb of the lead-acid battery 32 to be lower than the upper limit voltage Pbmax. Note that the upper limit voltage of the applied voltage to the electrical device group 45 may be set higher than the upper limit voltage Pbmax, which protects the electrical device group 45 from an excessive voltage.

[Battery Protection Control]

In an example implementation described above, even when the generated voltage Vg1 is raised higher than the upper limit voltages Limax and Pbmax in the regenerative electric power generation state of the starter generator 16, the terminal voltage VLi of the lithium-ion battery 31 may be lowered than the upper limit voltage Limax and the terminal voltage VPb of the lead-acid battery 32 may be lowered than the upper limit voltage Pbmax, by appropriately setting the electric resistance of each of the positive lines 33 to 35. However, in a situation where the amount of voltage drop in the positive lines 33 to 35 is insufficient, the terminal voltage VLi of the lithium-ion battery 31 may possibly reach the upper limit voltage Limax, or the terminal voltage VPb of the lead-acid battery 32 may possibly reach the upper limit voltage Pbmax. For example, a situation where the amount of voltage drop in the positive lines 33 to 35 is insufficient may include a situation where a charging electric current flowing into the lithium-ion battery 31 decreases, e.g. a situation where internal resistance of the lithium-ion battery 31 increases due to factors such as, but not limited to, aging deterioration, temperature fall, or a rise in the state of charge SOC.

When the charging current of the lithium-ion battery 31 decreases and the amount of voltage drop of the positive lines 33 to 35 becomes insufficient accordingly, the terminal voltage VLi of the lithium-ion battery 31 may possibly exceed the upper limit voltage Limax or the terminal voltage VPb of the lead-acid battery 32 may possibly exceed the upper limit voltage Pbmax. In order to protect the lithium-ion battery 31 and the lead-acid battery 32 from an excessive voltage, the electric power generation controller 52 of the main controller 50 may execute battery protection control performed by the starter generator 16. Note that the terminal voltage VLi of the lithium-ion battery 31 may be detected by a battery sensor 43, and the terminal voltage VPb of the lead-acid battery 32 may be detected by a battery sensor 46. In one implementation, the battery sensor 43 may serve as a "first voltage detector". In one implementation, the battery sensor 46 may serve as a "second voltage detector".

Figure 7:
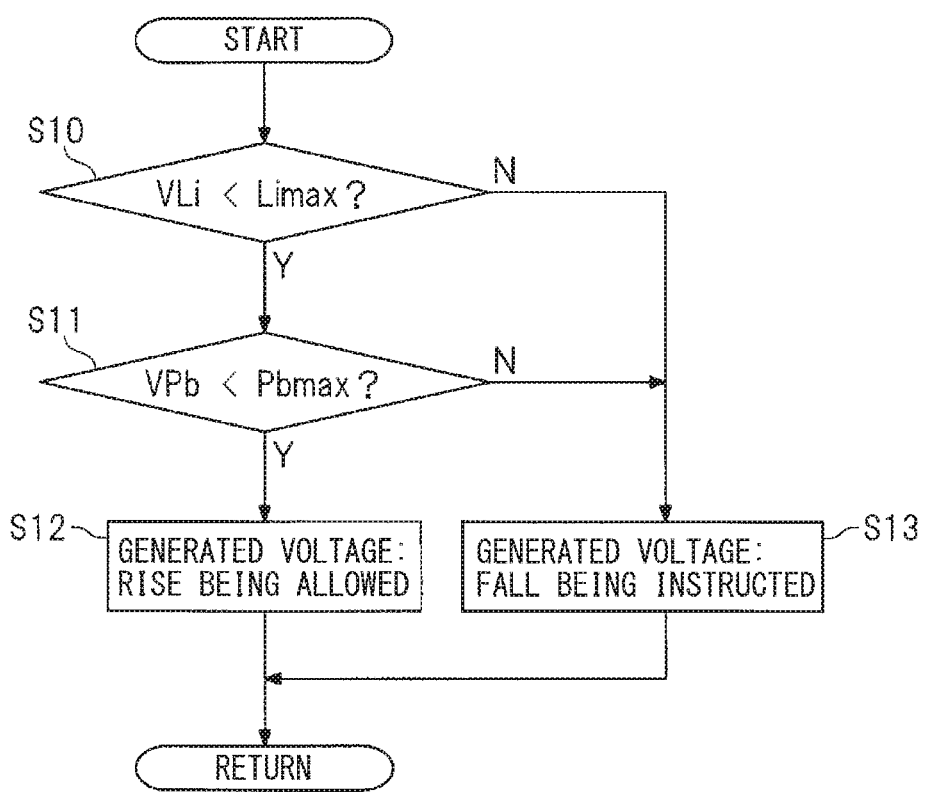
FIG. 7 is a flowchart illustrating an example of a procedure for executing battery protection control.

FIG. 7 is a flowchart illustrating an example of a procedure for executing the battery protection control. Referring to FIG. 7, a determination may be made in step S10 as to whether the terminal voltage VLi of the lithium-ion battery 31 is lower than the upper limit voltage Limax. When it is determined in step S10 that the terminal voltage VLi is lower than the upper limit voltage Limax ("Y" in step S10), the flow may proceed to step S11. In step S11, a determination may be made as to whether the terminal voltage VPb of the lead-acid battery 32 is lower than the upper limit voltage Pbmax. When it is determined in step S11 that the terminal voltage VPb is lower than the upper limit voltage Pbmax ("Y" in step S11), i.e. when it is determined that an excessive voltage has not been applied to both of the lithium-ion battery 31 and the lead-acid battery 32, the flow may proceed to step S12. In step S12, a rise in the generated voltage derived from the starter generator 16 may be permitted. In other words, in a situation where the rise in the generated voltage to be caused by electric power generation such as the regenerative electric power generation upon the vehicle deceleration is demanded, the flow may proceed to step S12 in which the generated voltage derived from the starter generator 16 may be raised.

In contrast, when it is determined in step S10 that the terminal voltage VLi of the lithium-ion battery 31 is higher than the upper limit voltage Limax ("N" in step S10), or when it is determined in step S11 that the terminal voltage VPb of the lead-acid battery 32 is higher than the upper limit voltage Pbmax ("N" in step S11), the flow may proceed to step S13. In step S13, the generated voltage derived from the starter generator 16 may be prevented from rising. In an example implementation, the generated voltage derived from the starter generator 16 may be prohibited from rising. In an alternative example implementation, the generated voltage derived from the starter generator 16 may be suppressed from rising. Further in step S13, the fall in the generated voltage derived from the starter generator 16 may be instructed. In other words, even in a situation where the rise in the generated voltage to be caused by electric power generation such as the regenerative electric power generation upon the vehicle deceleration is demanded, the generated voltage derived from the starter generator 16 may be lowered by a predetermined voltage when the flow proceeds to step S13. Thereafter, the routines starting from step S10 may be repeated again, and thereby, the generated voltage derived from the starter generator 16 may be lowered until the terminal voltage VLi is lower than the upper limit voltage Limax and the terminal voltage VPb is lower than the upper limit voltage Pbmax.

Figure 8:
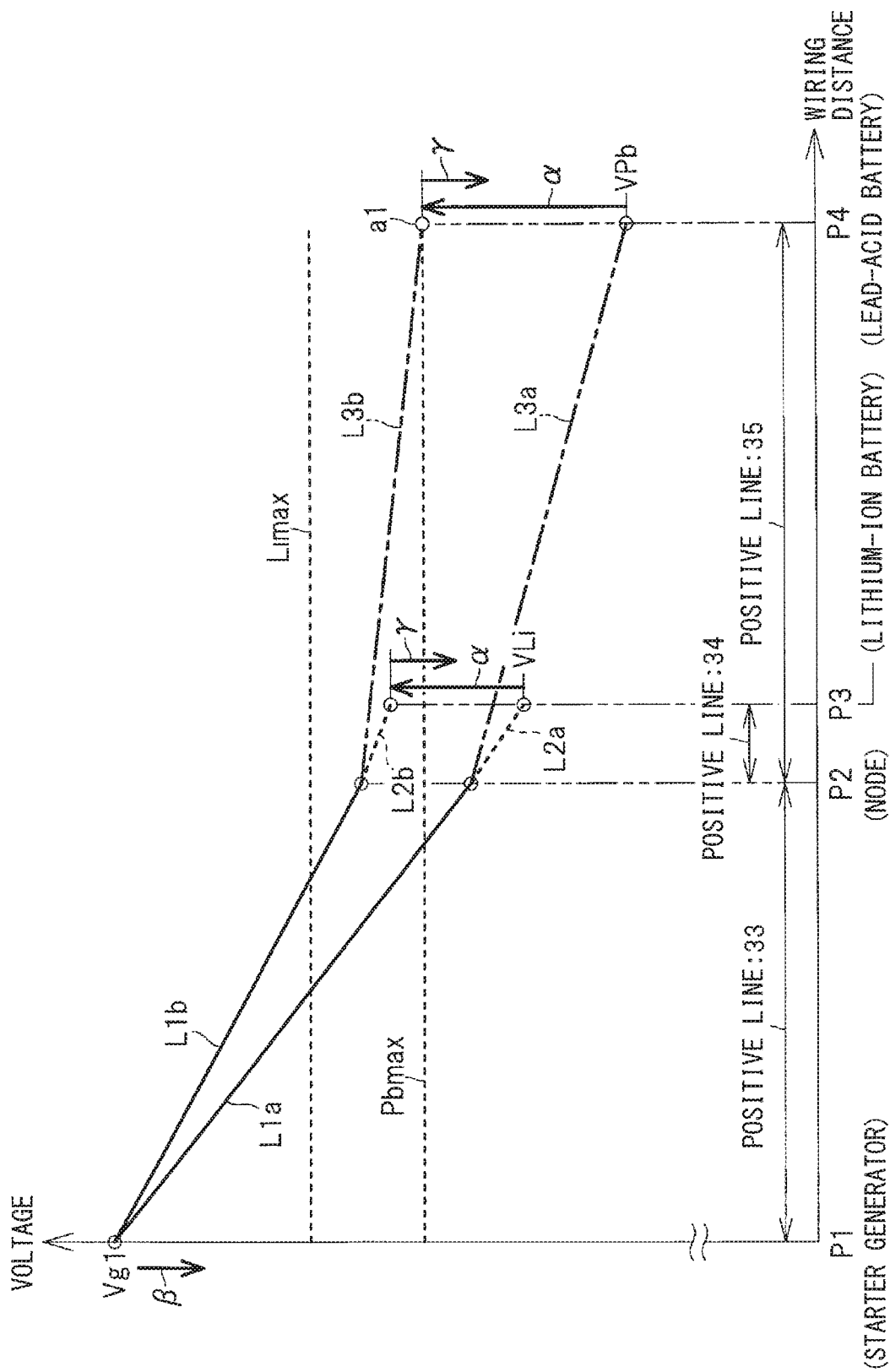
FIG. 8 is a diagram illustrating an example of a voltage drop situation in each part of the electric power supply circuit illustrated in FIG. 1.
Figure 9:
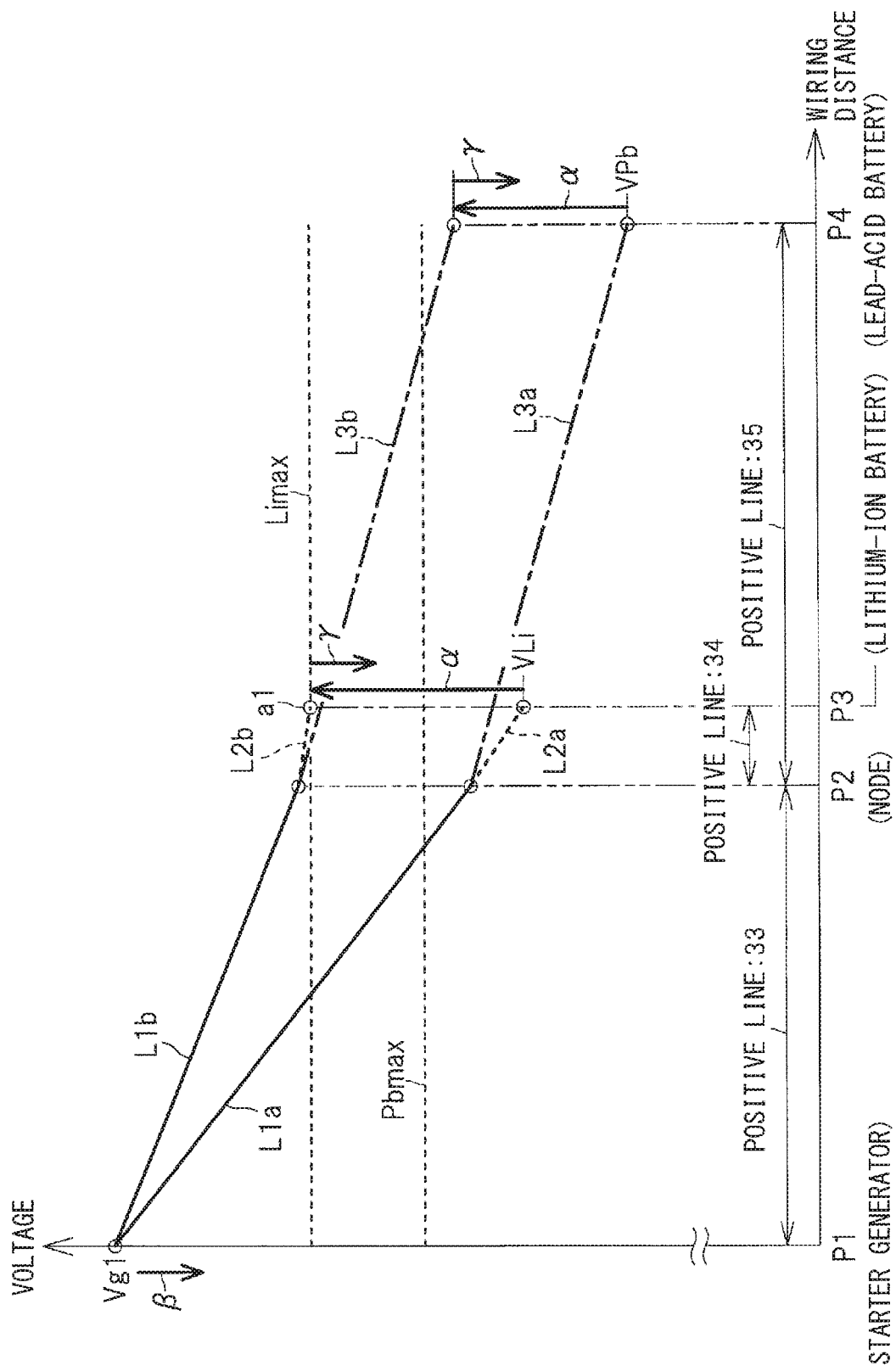
FIG. 9 is a diagram illustrating an example of a voltage drop situation in each part of the electric power supply circuit illustrated in FIG. 1.

FIGS. 8 and 9 each are a diagram illustrating an example of a voltage drop situation in each part of the electric power supply circuit 30. FIGS. 8 and 9 each illustrate a situation where the amount of voltage drop of the positive lines 33 to 35 is reduced, and thereby the generated voltage derived from the starter generator 16 is lowered. Further, in FIGS. 8 and 9, the voltage drop of the positive line 33 (the first conduction path in one implementation), is indicated by solid lines L1a and L1b; the voltage drop of the positive line 34 (the second conduction path in one implementation), is indicated by broken lines L2a and L2b; and the voltage drop of the positive line 35 (the third conduction path in one implementation), is indicated by alternate long and short dashed lines L3a and L3b. Note that the lines L1a, L2a, and L3a indicate a situation before the decrease of the amount of voltage drop, and lines L1b, L2b, and L3b indicate a situation after the decrease of the amount of voltage drop.

Referring to FIG. 8, when the charging electric current of the lithium-ion battery 31 is reduced under a situation where the generated voltage Vg1 derived from the starter generator 16 is controlled, the amount of voltage drop in the positive lines 33 to 35 is reduced. Therefore, the terminal voltage VLi of the lithium-ion battery 31 and the terminal voltage VPb of the lead-acid battery 32 are raised, as indicated by an arrow α. Thereafter, as indicated by a1, when the terminal voltage VPb of the lead-acid battery 32 reaches the upper limit voltage Pbmax, the generated voltage derived from the starter generator 16 may be prevented from rising, and the generated voltage derived from the starter generator 16 may be lowered, as indicated by an arrow β. This causes the terminal voltage VLi of the lithium-ion battery 31 and the terminal voltage VPb of the lead-acid battery 32 to be reduced, as indicated by an arrow γ. Hence, it is possible to protect the lithium-ion battery 31 and the lead-acid battery 32 from an excessive voltage.

Further, referring to FIG. 9, when the charging electric current of the lithium-ion battery 31 is reduced under a situation where the generated voltage Vg1 derived from the starter generator 16 is controlled, the amount of voltage drop in the positive lines 33 to 35 is reduced. Therefore, the terminal voltage VLi of the lithium-ion battery 31 and the terminal voltage VPb of the lead-acid battery 32 are raised, as indicated by an arrow α. Thereafter, as indicated by a1, when the terminal voltage LVi of the lithium-ion battery 31 reaches the upper limit voltage Limax, the generated voltage derived from the starter generator 16 may be prevented from rising, and the generated voltage derived from the starter generator 16 may be lowered, as indicated by an arrow β. This causes the terminal voltage VLi of the lithium-ion battery 31 and the terminal voltage VPb of the lead-acid battery 32 to be reduced, as indicated by an arrow γ. Hence, it is possible to protect the lithium-ion battery 31 and the lead-acid battery 32 from an excessive voltage.

In an example implementation described above, the electric power generation controller 52 of the main controller 50 prevents the generated voltage derived from the starter generator 16 from rising and may lower the generated voltage derived from the starter generator 16, when the terminal voltage VLi of the lithium-ion battery 31 reaches the upper limit voltage Limax or when the terminal voltage VPb of the lead-acid battery 32 reaches the upper limit voltage Pbmax. This makes it possible to protect the lithium-ion battery 31 and the lead-acid battery 32 from an excessive voltage when the starter generator 16 is to be controlled in the regenerative electric power generation state, even when the generated voltage derived from the starter generator 16 is raised higher than the upper limit voltages Limax and Pbmax. Accordingly, it is possible to increase the generated voltage derived from the starter generator 16 while protecting the lithium-ion battery 31 and the lead-acid battery 32. Hence, it is possible to increase the regenerative electric power and to thereby enhance an energy efficiency of the vehicle 11.

[Other Implementations (Battery Protection Control)]

Figure 10:
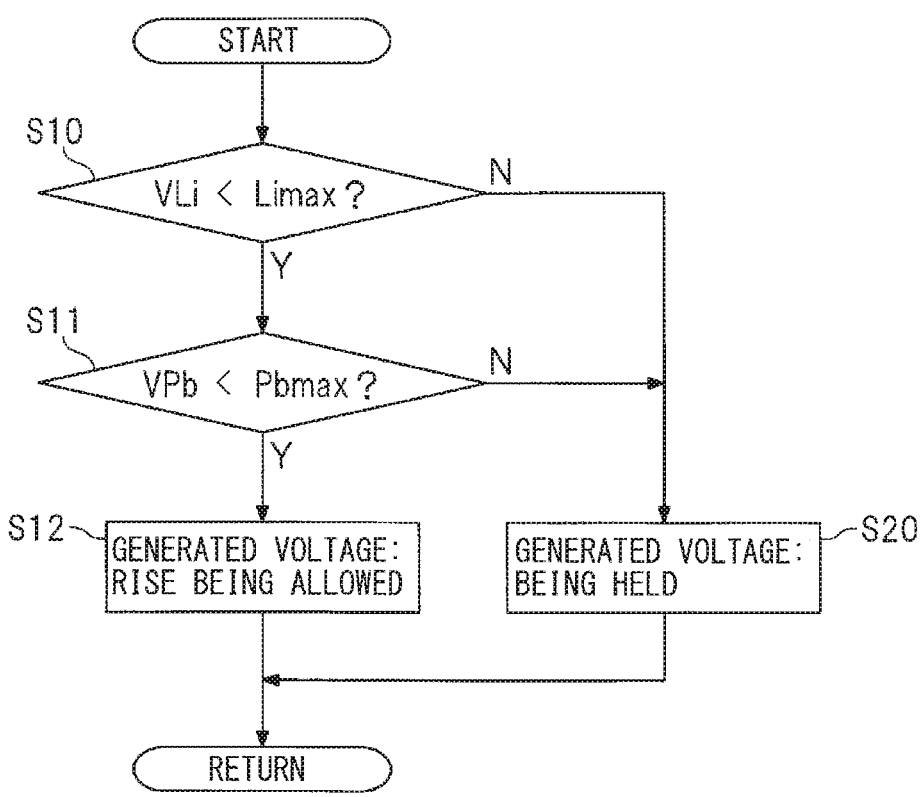
FIG. 10 is a flowchart illustrating another example of the procedure for executing the battery protection control.

A description is given next of another example implementation of the battery protection control executed by the electric power generation controller 52. In an example implementation described above, the generated voltage derived from the starter generator 16 may be lowered when the terminal voltage VLi of the lithium-ion battery 31 reaches the upper limit voltage Limax or when the terminal voltage VPb of the lead-acid battery 32 reaches the upper limit voltage Pbmax; however, this is not limitative. FIG. 10 is a flowchart illustrating another example of a procedure for executing the battery protection control. Note that, in FIG. 10, steps similar to those in FIG. 7 are denoted with the same reference numerals and the descriptions thereof will not be provided in detail.

Referring to FIG. 10, when it is determined in step S10 that the terminal voltage VLi of the lithium-ion battery 31 is higher than the upper limit voltage Limax ("N" in step S10), or when it is determined in step S11 that the terminal voltage VPb of the lead-acid battery 32 is higher than the upper limit voltage Pbmax ("N" in step S11), the flow may proceed to step S20. In step S20, the generated voltage derived from the starter generator 16 may be prevented from rising. Further, in step S20, the voltage derived from the starter generator 16 may be maintained. In other words, even when the raise in the generated voltage to be caused by electric power generation such as regenerative electric power generation upon the vehicle deceleration is demanded, the generated voltage derived from the starter generator 16 may be maintained when the flow proceeds to step S20.

This makes it possible to protect the lithium-ion battery 31 and the lead-acid battery 32 from an excessive voltage even when the generated voltage derived from the starter generator 16 is raised higher than the upper limit voltages Limax and Pbmax, when the starter generator 16 is to be controlled in the regenerative electric power generation state. Accordingly, it is possible to raise the generated voltage derived from the starter generator 16 while protecting the lithium-ion battery 31 and the lead-acid battery 32. Hence, it is possible to increase the regenerative electric power and to thereby enhance an energy efficiency of the vehicle 11.

[Other Implementations (Regenerative Electric Power Generation Control and Battery Protection Control)]

Figure 11:
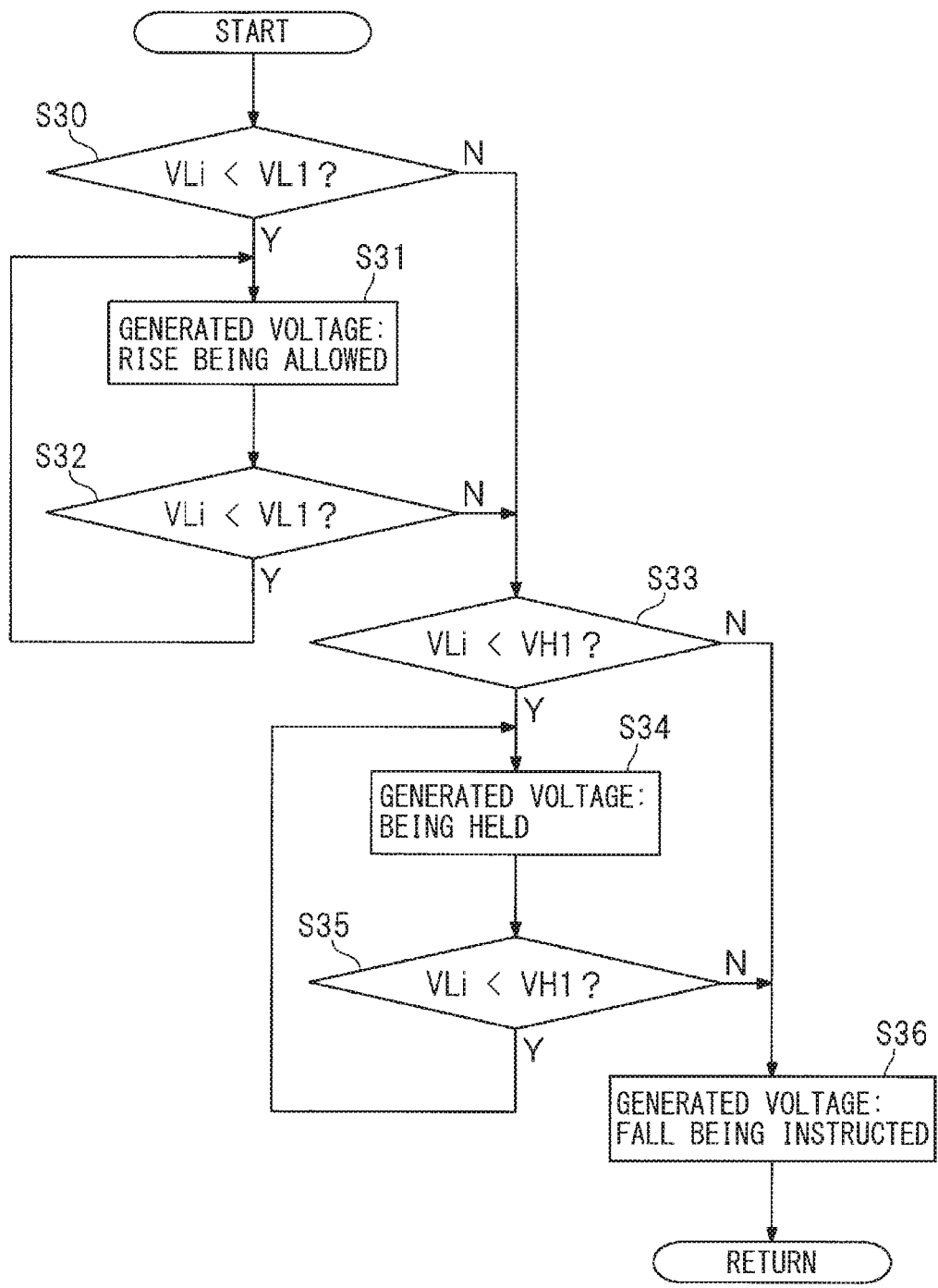
FIG. 11 is a flowchart illustrating regenerative electric power generation control and another example of the procedure for executing the battery protection control.
Figure 12:
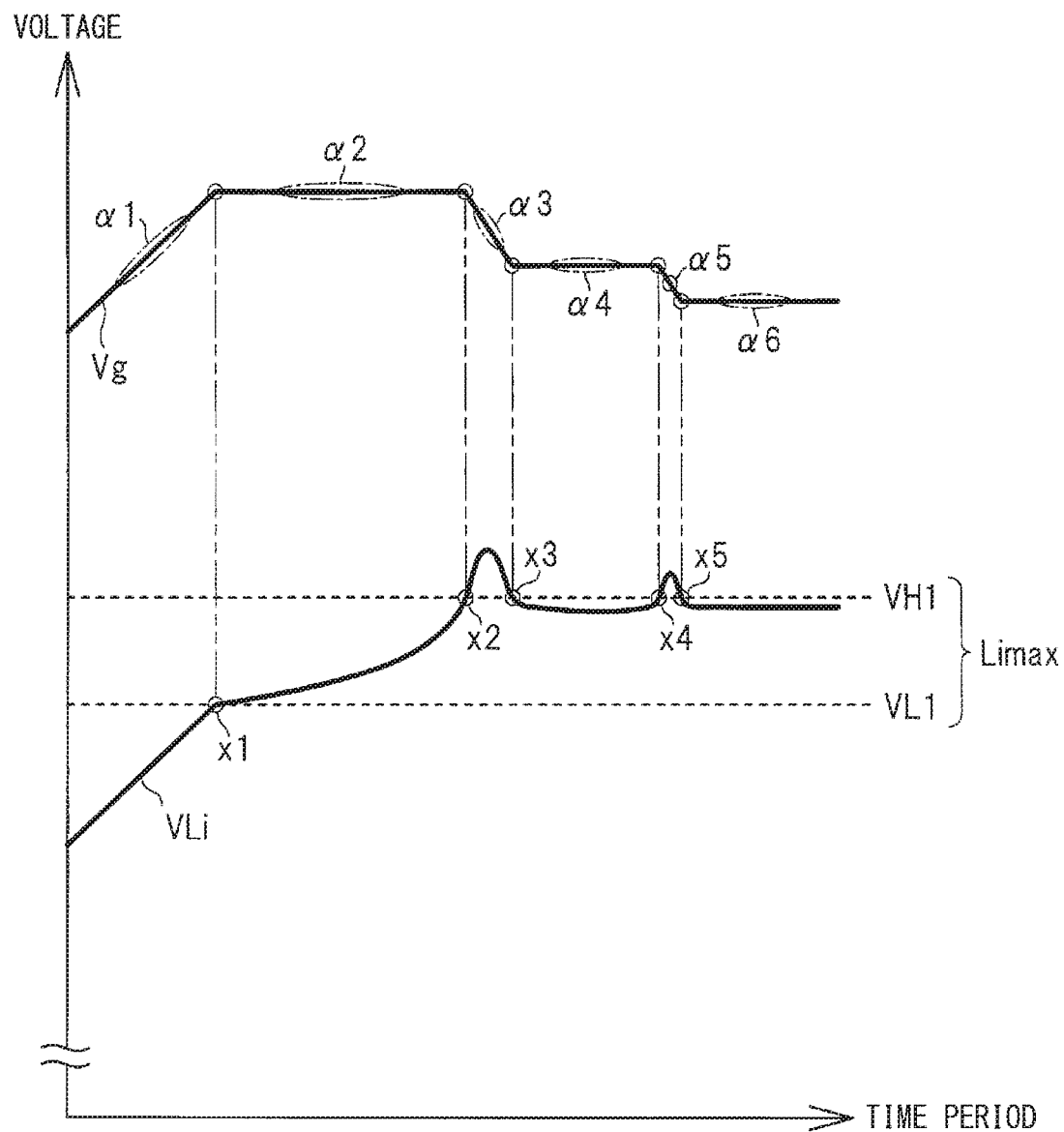
FIG. 12 is a timing chart illustrating an example of transition of a generated voltage derived from a starter generator and terminal voltage of a lithium-ion battery.
Figure 13:
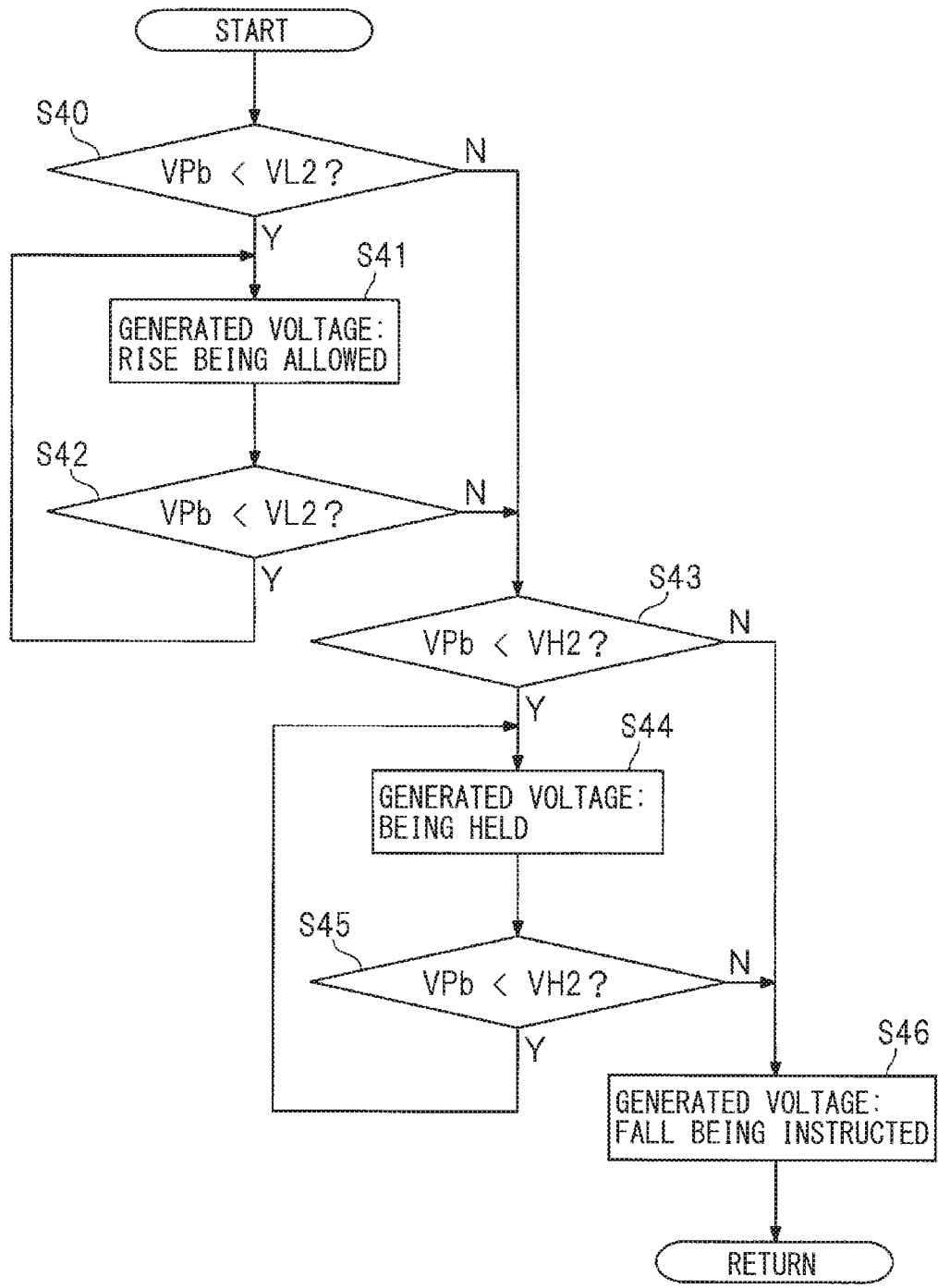
FIG. 13 is a flowchart illustrating the regenerative electric power generation control and another example of the procedure for executing the battery protection control.
Figure 14:
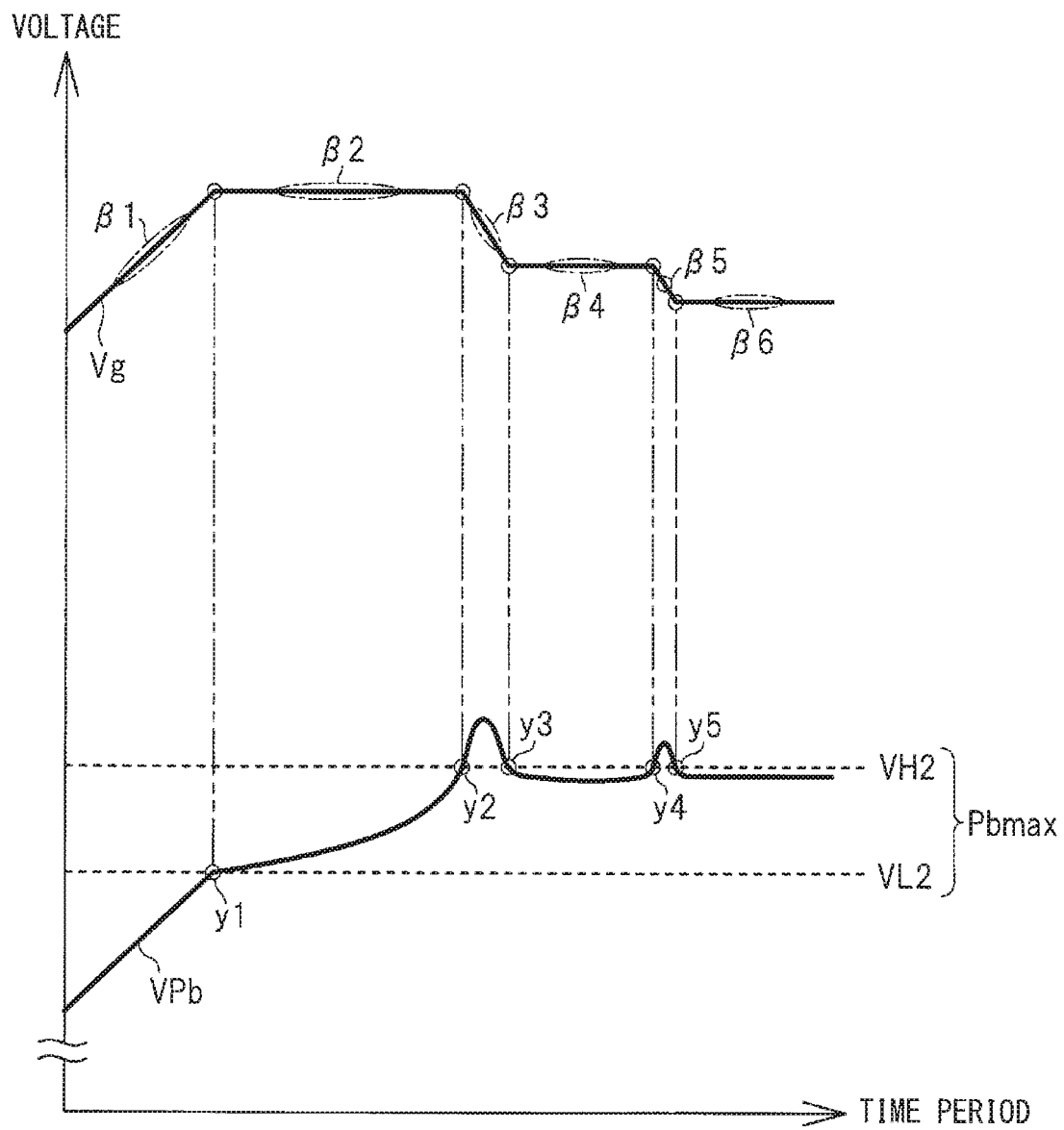
FIG. 14 is a timing chart illustrating an example of transition of a generated voltage derived from the starter generator and a terminal voltage of a lead-acid battery.

A description is given next of other example implementations of the regenerative electric power generation control and the battery protection control executed by the electric power generation controller 52. In terms of improving the energy efficiency of the vehicle 11, when the starter generator 16 is to be controlled in the regenerative electric power generation state, the generated voltage derived from the starter generator 16 may be maintained high while avoiding excessive charge of the lithium-ion battery 31 and the lead-acid battery 32. One method to deal with this may be to execute, by the electric power generation controller 52 of the main controller 50, the regenerative electric power generation control and the battery protection control in accordance with the following example procedure. FIG. 11 is a flowchart illustrating another example of a procedure for executing the regenerative electric power generation control and the battery protection control. FIG. 12 is a timing chart illustrating an example of transition of the generated voltage Vg derived from the starter generator 16 and the terminal voltage VLi of the lithium-ion battery 31. FIG. 13 is a flowchart illustrating another example of the procedure for executing the regenerative electric power generation control and the battery protection control. FIG. 14 is a timing chart illustrating an example of transition of the generated voltage Vg derived from the starter generator 16 and the terminal voltage VPb of the lead-acid battery 32.

[Lithium-Ion Battery Protection]

A description is given first of an example of the regenerative electric power generation control that protects the lithium-ion battery 31. Referring to FIG. 12, in terms of suppressing deterioration of characteristics such as reduction in battery capacity or reduction in output electric power, a low-voltage side voltage VL1 and a high-voltage side voltage VH1 may be set for the lithium-ion battery 31. The low-voltage side voltage VL1 and the high-voltage side voltage VH1 each may be, for example, the upper limit voltage Limax of an applied voltage. The high-voltage side voltage VH1 may be set higher than the low-voltage side voltage VL1. In one implementation, the upper limit voltage Limax of the applied voltage may serve as a "first allowable voltage". In one implementation, the low-voltage side voltage VL1 may serve as a "first low-voltage side voltage". In one implementation, the high-voltage side voltage VH1 may serve as a "first high-voltage side voltage". In other words, in the regenerative electric power generation control of the starter generator 16, the generated voltage Vg derived from the starter generator 16 may be so controlled as to maintain the terminal voltage VLi of the lithium-ion battery 31 in proximity to the high-voltage side voltage VH1, in terms of increasing the regenerative electric power generation while protecting the lithium-ion battery 31. A description is given below of a procedure for controlling the generated voltage Vg derived from the starter generator 16.

Referring to FIG. 11, a determination may be made in step S30 as to whether the terminal voltage VLi of the lithium-ion battery 31 is lower than the low-voltage side voltage VL1. When it is determined in step S30 that the terminal voltage VLi is lower than the low-voltage side voltage VL1

("Y" in step S30), the flow may proceed to step S31. In step S31, a rise in the generated voltage Vg derived from the starter generator 16 may be instructed. When it is determined in the step S32 that the terminal voltage VLi is lower than the low-voltage side voltage VL1 ("Y" in step S32), the flow may return to step S31. In step S31, the rise in the generated voltage Vg derived from the starter generator 16 may be instructed, following which the flow may proceed to step S32. In other words, in a region in which the terminal voltage VLi of the lithium-ion battery 31 is lower than the low-voltage side voltage VL1, the rise in the generated voltage Vg derived from the starter generator 16 may be continuously instructed.

When it is determined in the above-described step S30 or step S32 that the terminal voltage VLi is higher than the low-voltage side voltage VL1 ("N" in step S30 or step S32), the flow may proceed to step S33. In step S33, a determination may be made as to whether the terminal voltage VLi is lower than the high-voltage side voltage VH1. When it is determined in step S33 that the terminal voltage VLi is lower than the high-voltage side voltage VH1 ("Y" in step S33), i.e. when it is determined in step S33 that the terminal voltage VLi is higher than the low-voltage side voltage VL1 and is lower than the high-voltage-side voltage VH1, the flow may proceed to step S34. In step S34, the generated voltage Vg derived from the starter generator 16 may be prevented from rising. Further, in step S34, the generated voltage Vg derived from the starter generator 16 may be maintained, following which the flow may proceed to step S35. When it is determined in the step S35 that the terminal voltage VLi is lower than the high-voltage side voltage VH1 ("Y" in step S35), the flow may return to step S34. In step S34, the generated voltage Vg derived from the starter generator 16 may be maintained. In other words, in a region in which the terminal voltage VLi of the lithium-ion battery 31 is higher than the low-voltage side voltage VL1 and is lower than the high-voltage side voltage VH1, the generated voltage Vg derived from the starter generator 16 may be continuously maintained.

When it is determined in the above-described step S33 or step S35 that the terminal voltage VLi is higher than the high-voltage side voltage VH1 ("N" in step S33 or step S35), the flow may proceed to step S36. In step S36, the generated voltage Vg derived from the starter generator 16 may be prevented from rising. Further, in step S36, the fall in the generated voltage Vg derived from the starter generator 16 may be instructed. Further, when a situation in which the terminal voltage VLi is higher than the high-voltage side voltage VH1 still continues even when the fall in the generated voltage Vg has been instructed, the flow may proceed to step S30 and step S33 again, and thereafter to step S36. In step S36, the fall in the generated voltage Vg derived from the starter generator 16 may be instructed again. In other words, in a region in which the terminal voltage VLi of the lithium-ion battery 31 is higher than the high-voltage side voltage VH1, the fall in the generated voltage Vg derived from the starter generator 16 may be continuously instructed.

A description is given next of the regenerative electric power generation control of the starter generator 16 with reference to a timing chart illustrated by way of example in FIG. 12. Referring to FIG. 12, in a region in which the terminal voltage VLi of the lithium-ion battery 31 is lower than the low-voltage side voltage VL1, the generated voltage Vg derived from the starter generator 16 may be continuously raised ($\alpha$1). Thereafter, when the terminal voltage VLi reaches the low-voltage side voltage VL1 (x1), the generated voltage Vg may be prevented from rising, and thereby the generated voltage Vg may be maintained ($\alpha$2). However, even when the generated voltage Vg is maintained in this way, the internal resistance of each of the lithium-ion battery 31 and the lead-acid battery 32 may still increase due to charging. Therefore, the terminal voltage VLi may gradually increase toward the high-voltage side voltage VH1. Thereafter, when the terminal voltage VLi reaches the high-voltage side voltage VH1 (x2), the generated voltage Vg derived from the starter generator 16 may be lowered ($\alpha$3) in order to protect the lithium-ion battery 31 by lowering the terminal voltage VLi. Thereafter, when the terminal voltage VLi is reduced to the high-voltage side voltage VH1 (x3), the generated voltage Vg derived from the starter generator 16 may be maintained constant ($\alpha$4).

Further, the internal resistance of each of the lithium-ion battery 31 and the lead-acid battery 32 may increase due to the charging, and thereby, the terminal voltage VLi may gradually increase again toward the high-voltage side voltage VH1. Thereafter, when the terminal voltage VLi reaches the high-voltage side voltage VH1 (x4), the generated voltage Vg derived from the starter generator 16 may be lowered again ($\alpha$5). Thereafter, when the terminal voltage VLi is reduced to the high-voltage side voltage VH1 (x5), the generated voltage Vg derived from the starter generator 16 may be maintained constant ($\alpha$6). Accordingly, controlling the generated voltage Vg derived from the starter generator 16 on the basis of the terminal voltage VLi of the lithium-ion battery 31 makes it possible to maintain the terminal voltage VLi to the high-voltage side voltage VH1 without causing a situation such as excessive overshoot of the terminal voltage VLi. In other words, it is possible to raise the generated voltage Vg and increase the regenerative electric power while protecting the lithium-ion battery 31.

[Lead-Acid Battery Protection]

A description is given next of the regenerative electric power generation control that protects the lead-acid battery 32. Referring to FIG. 14, in terms of suppressing deterioration of factors such as reduction in battery capacity or reduction in output electric power, a low-voltage side voltage VL2 and a high-voltage side voltage VH2 may be set for the lead-acid battery 32. The low-voltage side voltage VL2 and the high-voltage side voltage VH2 each may be the upper limit voltage Pbmax of an applied voltage. The high-voltage side voltage VH2 may be set higher than the low-voltage side voltage VL2. In one implementation, the upper limit voltage Pbmax of the applied voltage may serve as a "second allowable voltage". In one implementation, the low-voltage side voltage VL2 may serve as a "second low-voltage side voltage". In one implementation, the high-voltage side voltage VH2 may serve as a "second high-voltage side voltage". In other words, in the regenerative electric power generation control of the starter generator 16, the generated voltage Vg derived from the starter generator 16 may be so controlled as to maintain the terminal voltage VPb of the lead-acid battery 32 in proximity to the high-voltage side voltage VH2, in terms of increasing the regenerative electric power generation while protecting the lead-acid battery 32. A description is given below of a procedure for controlling the generated voltage Vg derived from the starter generator 16.

Referring to FIG. 13, a determination may be made in step S40 as to whether the terminal voltage VPb of the lead-acid battery 32 is lower than the low-voltage side voltage VL2. When it is determined in step S40 that the terminal voltage VPb is lower than the low-voltage side voltage VL2 ("Y" in step S40), the flow may proceed to step S41. In step S41, the rise in the generated voltage Vg derived from the starter generator 16 may be instructed, following which the flow may proceed to step S42. When it is determined in step S42 that the terminal voltage VPb is lower than the low-voltage side voltage VL2 ("Y" in step S42), the flow may return to step S41. In step S41, the rise in the generated voltage Vg derived from the starter generator 16 may be instructed. In other words, in a region in which the terminal voltage VPb of the lead-acid battery 32 is lower than the low-voltage side voltage VL2, the rise in the generated voltage Vg derived from the starter generator 16 may be continuously instructed.

When it is determined in the above-described step S40 or step S42 that the terminal voltage VPb is higher than the low-voltage side voltage VL2 ("N" in step S40 or step S42), the flow may proceed to step S43. In step S43, a determination may be made as to whether the terminal voltage VPb is lower than the high-voltage side voltage VH2. When it is determined in step S43 that the terminal voltage VPb is lower than the high-voltage side voltage VH2 ("Y" in step S43), i.e. when it is determined in step S43 that the terminal voltage VPb is higher than the low-voltage side voltage VL2 and is lower than the high-voltage side voltage VH2, the flow may proceed to step S44. In step S44, the generated voltage Vg derived from the starter generator 16 may be prevented from rising. Further in step S44, the generated voltage Vg derived from the starter generator 16 may be maintained, following which the flow may proceed to step S45. When it is determined in step S45 that the terminal voltage VPb is lower than the high-voltage side voltage VH2 ("Y" in step S45), the flow may proceed to step S44. In step S44, the generated voltage Vg derived from the starter generator 16 may be maintained. In other words, in a region in which the terminal voltage VPb of the lead-acid battery 32 is higher than the low-voltage side voltage VL2 and is lower than the low-voltage side voltage VH2, the generated voltage Vg derived from the starter generator 16 may be continuously maintained.

When it is determined in the above-described step S43 or step S45 that the terminal voltage VPb is higher than the high-voltage side voltage VH2 ("N" in step S43 and step S45), the flow may proceed to step S46. In step S46, the generated voltage Vg derived from the starter generator 16 may be prevented from rising. Further, in step S46, the fall in the generated voltage Vg derived from the starter generator 16 may be instructed. Further, when a situation in which the terminal voltage VPb is higher than the high-voltage side voltage VH2 still continues even when the fall in the generated voltage Vg has been instructed, the flow may proceed to step S40 and S43 again, and thereafter to step S46. In step S46, the fall in the generated voltage Vg derived from the starter generator 16 may be instructed again. In other words, in a region in which the terminal voltage VPb of the lead-acid battery 32 is higher than the high-voltage side voltage VH2, the fall in the generated voltage Vg derived from the starter generator 16 may be continuously instructed.

A description is given next of the regenerative electric power generation control of the starter generator 16 with reference to a timing chart illustrated by way of example in FIG. 14. Referring to FIG. 14, in a region in which the terminal voltage VPb of the lead-acid battery 32 is lower than the low-voltage side voltage VL2, the generated voltage Vg derived from the starter generator 16 may be continuously raised (β1). Thereafter, when the terminal voltage VPb reaches the low-voltage side voltage VL2 (y1), the generated voltage Vg may be prevented from rising, and thereby the generated voltage Vg may be maintained (β2). However, even when the generated voltage Vg is maintained in this way, the internal resistance of each of the lithium-ion battery 31 and the lead-acid battery 32 may still increase due to charging. Therefore, the terminal voltage VPb may gradually increase toward the high-voltage side voltage VH2. Thereafter, when the terminal voltage VPb reaches the high-voltage side voltage VH2 (y2), the generated voltage Vg derived from the starter generator 16 may be lowered (β3) in order to protect the lead-acid battery 32 by lowering the terminal voltage VPb. Thereafter, when the terminal voltage VPb is reduced to the high-voltage side voltage VH2 (y3), the generated voltage Vg derived from the starter generator 16 may be maintained constant (β4).

Further, the internal resistance of each of the lithium-ion battery 31 and the lead-acid battery 32 may increase due to the charging, and thereby, the terminal voltage VPb may gradually increase again toward the high-voltage side voltage VH2. Thereafter, when the terminal voltage VPb reaches the high-voltage side voltage VH2 (y4), the generated voltage Vg derived from the starter generator 16 may be lowered again (β5). Thereafter, when the terminal voltage VPb is reduced to the high-voltage side voltage VH2 (y5), the generated voltage Vg derived from the starter generator 16 may be maintained constant (β6). Accordingly, controlling the generated voltage Vg derived from the starter generator 16 on the basis of the terminal voltage VPb of the lead-acid battery 32 makes it possible to maintain the terminal voltage VPb to the high-voltage side voltage VH2 without causing a situation such as excessive overshoot of the terminal voltage VPb. In other words, it is possible to raise the generated voltage Vg and increase the regenerative electric power while protecting the lead-acid battery 32.

Note that, in an example implementation, the electric resistance of each of the positive lines 33 and 34 may be so set as to allow the terminal voltage VLi of the lithium-ion battery 31 to be lower than the high-voltage side voltage VH1, under a situation where the generated voltage Vg is controlled higher than the high-voltage side voltages VH1 and VH2. The positive lines 33 and 34 may couple the starter generator 16 and the lithium-ion battery 31 to each other. Similarly, the electric resistance of each of the positive lines 33 and 35 may be so set as to allow the terminal voltage VPb of the lead-acid battery 32 to be lower than the high-voltage-side voltage VH2 under a situation where the generated voltage Vg is controlled higher than the high-voltage side voltages VH1 and VH2. The positive lines 33 and 35 may couple the starter generator 16 and the lead-acid battery 32 to each other.

[Cooperation of Lithium-Ion Battery Protection and Lead-Acid Battery Protection]

In an example implementation described above, the regenerative electric power generation control in accordance with the flowchart of FIG. 11 is executed in terms of the protection of the lithium-ion battery 31, and the regenerative electric power generation control in accordance with the flowchart of FIG. 13 is executed in terms of the protection of the lead-acid battery 32. However, these regenerative electric power generation controls may be executed cooperatively. In other words, when the fall of the generated voltage Vg is instructed in step S36 of FIG. 11, the generated voltage Vg may be preferentially lowered in terms of the protection of the lithium-ion battery 31, even when the rise or the maintaining of the generated voltage Vg is instructed in step S41 or S44 in FIG. 13. Similarly, when the fall of the generated voltage Vg is instructed in step S46 of FIG. 13, the generated voltage Vg may be preferentially lowered in terms of the protection of the lead-acid battery 32, even when the rise or the maintaining of the generated voltage Vg is instructed in step S31 or S34 of FIG. 11. Further, when the maintaining of the generated voltage Vg is instructed in step S34 of FIG. 11, the generated voltage Vg may be preferentially maintained in terms of the protection of the lithium-ion battery 31, even when the rise in the generated voltage Vg is instructed in step S41 of FIG. 13. Similarly, when the maintaining of the generated voltage Vg is instructed in step S44 of FIG. 13, the generated voltage Vg may be preferentially maintained in terms of the protection of the lead-acid battery 32, even when the rise in the generated voltage Vg is instructed in step S31 of FIG. 11.

The technology is by no means limited to the example implementations described above. Various changes and modifications may be made to any implementation without departing from the scope of the technology. For example, in an example illustrated in FIG. 7, when the terminal voltage VLi reaches the upper limit voltage Limax, and when the terminal voltage VPb reaches the upper limit voltage Pbmax, the generated voltage derived from the starter generator 16 is lowered; however, this is not limitative. In an example implementation, when the terminal voltage VLi reaches the upper limit voltage Limax, the generated voltage derived from the starter generator 16 may be lowered, and when the terminal voltage VPb reaches the upper limit value Pbmax, the generated voltage derived from the starter generator 16 may be maintained. Further, when the terminal voltage VLi reaches the upper limit voltage Limax, the generated voltage derived from the starter generator 16 may be maintained, and when the terminal voltage VPb reaches the upper limit voltage Pbmax, the generated voltage derived from the starter generator 16 may be lowered.

In the example implementations illustrated in FIG. 11 and FIG. 13, when the terminal voltage VLi reaches the upper limit voltage Limax (i.e. the low-voltage side voltage VL1, the high-voltage side voltage VH1), the generated voltage derived from the starter generator 16 is maintained and thereafter lowered. Further, when the terminal voltage VPb reaches the upper limit voltage Pbmax (i.e. the low-voltage side voltage VL2, the high-voltage side voltage VH2), the generated voltage derived from the starter generator 16 is maintained and thereafter lowered. However, these are not limitative. In an example implementation, when the terminal voltage VLi reaches the upper limit voltage Limax (i.e. the low-voltage side voltage VL1, the high-voltage side voltage VH1), the generated voltage derived from the starter generator 16 may be maintained and thereafter lowered. Further, when the terminal voltage VPb reaches the upper limit voltage Pbmax, the generated voltage derived from the starter generator 16 may be maintained or lowered. Similarly, when the terminal voltage VLi reaches the upper limit voltage Limax, the generated voltage of the starter generator 16 may be maintained or lowered. Further, when the terminal voltage VPb reaches the upper limit voltage Pbmax (i.e. the low-voltage side voltage VL2, the high-voltage side voltage VH2), the generated voltage derived from the starter generator 16 may be maintained and thereafter lowered.

In an example implementation described above, the lithium-ion battery 31 is used as the first electric power storage, and the lead-acid battery 32 is used as the second electric power storage; however, this is not limitative. In an example implementation, another battery or a capacitor may be used as the first electric power storage and the second electric power storage. In another alternative implementation, different types of electric power storages from each other may be used as the first electric power storage and the second electric power storage, or the same type of electric power storages may be used as the first electric power storage and the second electric power storage.

In an example implementation described above, the upper limit voltage Limax of the lithium-ion battery 31 (for example, 15V) is set higher than the upper limit voltage Pbmax of the lead-acid battery 32 (for example, 14.3 V); however, this is not limitative. In an example implementation, the upper limit voltage Limax may be set lower than the upper limit voltage Pbmax, or may be the same as the upper limit voltage Pbmax. Further, in an example implementation described above, the starter generator 16 is used as the electric power generator; however, this is not limitative. An electric generator that does not serve as a motor may be used. Further, in an example implementation described above, the electric power generation controller 52 is provided in the main controller 50; however, this is not limitative. The electric power generation controller may be provided in another controller.

Note that, in an illustrated example implementation, the positive line 34 of the lithium-ion battery 31 is provided with the switch SW2; however, this is not limitative. In an alternative implementation, as indicated by the alternate long and short dashed line in FIG. 2, the switch SW2 may be provided to the negative line 38 of the lithium-ion battery 31. Further, in an example implementation by way of illustration, the switch SW2 is provided in terms of the stop of charge and discharge when an abnormality occurs in the lithium-ion battery 31, and further, the switch SW1 is provided in terms of the prevention of an instantaneous voltage drop in the electrical device group 45; however, this is not limitative. The switch SW1 and the switch SW2 may be removed from the electric power supply circuit 30.

The main controller 50 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the main controller 60. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the main controller 50 illustrated in FIG. 1.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle electric power generation apparatus comprising:
an electric power generator coupled to a wheel via a power transmission path; a first electric power storage coupled to the electric power generator; a second electric power storage coupled to the electric power generator and coupled to the first electric power storage in parallel; a first voltage detector configured to detect a terminal voltage of the first electric power storage; a second voltage detector configured to detect a terminal voltage of the second electric power storage; and an electric power generation controller configured to; set, as a first allowable voltage, an upper limit value of the terminal voltage of the first electric power storage; set, as a second allowable voltage, an upper limit value of the terminal voltage of the second electric power storage; when the electric power generator is to be controlled in a regenerative electric power generation state, raise a generated voltage derived from the electric power generator to a first generated voltage, wherein the first generated voltage is higher than both of the first allowable voltage and the second allowable voltage; after the generated voltage is raised to the first generated voltage, when the terminal voltage of the first electric power storage is lower than the first allowable voltage and the terminal voltage of the second electric power storage is lower than the second allowable voltage, further raise the generated voltage; and after the generated voltage is raised to the first generated voltage, when the terminal voltage of the first electric power storage is equal to or higher than the first allowable voltage or the terminal voltage of the second electric power storage is equal to or higher than the second allowable voltage, lower the generated voltage.

2. The vehicle electric power generation apparatus according to claim 1, further comprising:
a first conduction path coupled to a positive terminal of the electric power generator;
a second conduction path coupled to a positive terminal of the first electric power storage;
a third conduction path coupled to a positive terminal of the second electric power storage; and
a node that couples the first conduction path, the second conduction path, and the third conduction path to one another,
wherein electric resistance of the first conduction path and electric resistance of the second conduction path are set to allow the terminal voltage of the first electric power storage to be lower than the first allowable voltage, when the generated voltage of the electric power generator is set to the first generated voltage, and
the electric resistance of the first conduction path and electric resistance of the third conduction path are set to allow the terminal voltage of the second electric power storage to be lower than the second allowable voltage, when the generated voltage of the electric power generator is set to the first generated voltage.

3. A vehicle electric power generation apparatus comprising: an electric power generator coupled to a wheel via a power transmission path; a first electric power storage coupled to the electric power generator; a second electric power storage coupled to the electric power generator and coupled to the first electric power storage in parallel; a first voltage detector configured to detect a terminal voltage of the first electric power storage; a second voltage detector configured to detect a terminal voltage of the second electric power storage; and circuitry configured to set, as a first allowable voltage, an upper limit value of the terminal voltage of the first electric power storage, set, as a second allowable voltage, an upper limit value of the terminal voltage of the second electric power storage, when the electric power generator is to be controlled in a regenerative electric power generation state, raise a generated voltage derived from the electric power generator to a first generated voltage, wherein the first generated voltage is higher than both of the first allowable voltage and the second allowable voltage; after the generated voltage is raised to the first generated voltage, when the terminal voltage of the first electric power storage is lower than the first allowable voltage and the terminal voltage of the second electric power storage is lower than the second allowable voltage, further raise the generated voltage; and after the generated voltage is raised to the first generated voltage, when the terminal voltage of the first electric power storage is equal to or higher than the first allowable voltage or the terminal voltage of the second electric power storage is equal to or higher than the second allowable voltage, lower the generated voltage.

4. A vehicle electric power generation apparatus comprising: an electric power generator coupled to a wheel via a power transmission path; a first electric power storage coupled to the electric power generator; a second electric power storage coupled to the electric power generator and coupled to the first electric power storage in parallel; a first voltage detector configured to detect a terminal voltage of the first electric power storage; a second voltage detector configured to detect a terminal voltage of the second electric power storage; and an electric power generation controller configured to: set, as a first allowable voltage, an upper limit value of the terminal voltage of the first electric power storage, wherein the first allowable voltage comprises a first low-voltage side voltage and a first high-voltage side voltage that is higher than the first low-voltage side voltage; set, as a second allowable voltage, an upper limit value of the terminal voltage of the second electric power storage, wherein the second allowable voltage comprises a second low-voltage side voltage and a second high-voltage side voltage that is higher than the second low-voltage side voltage; when the electric power generator is to be controlled in a regenerative electric power generation state, raise a generated voltage derived from the electric power generator to a first generated voltage, wherein the first generated voltage is higher than both of the first allowable voltage and the second allowable voltage; after the generated voltage is raised to the first generated voltage, when the terminal voltage of the first electric power storage is lower than the first low-voltage side voltage and the terminal voltage of the second electric power storage is lower than the second low-voltage side voltage, further raise the generated voltage; after the generated voltage is raised to the first generated voltage, when the terminal voltage of the first electric power storage is equal to or higher than the first high-voltage side voltage or the terminal voltage of the second electric power storage is equal to or higher than the second high-voltage side voltage, lower the generated voltage; and after the generated voltage is raised to the first generated voltage, when the terminal voltage of the first electric power storage is equal to or higher than the first low-voltage side voltage and lower than the first high-voltage side voltage or the terminal voltage of the second electric power storage is equal to or higher than the second low-voltage side voltage and lower than the second high-voltage side voltage, maintain the generated voltage at the first generated voltage.

5. The vehicle electric power generation apparatus according to claim 4, wherein an internal resistance of the second electric power storage is higher than an internal resistance of the first electric power storage.

\* \* \* \* \*